(12) United States Patent
Maschwitz

(10) Patent No.: US 7,951,473 B2
(45) Date of Patent: May 31, 2011

(54) OPTICAL COATING WITH IMPROVED DURABILITY

(75) Inventor: Peter Maschwitz, Sebastopol, CA (US)

(73) Assignee: AGC Flat Glass North America, Inc., Alpharetta, GA (US)

( * ) Notice: Subject to any disclaimer, the term of this patent is extended or adjusted under 35 U.S.C. 154(b) by 637 days.

(21) Appl. No.: 11/938,009

(22) Filed: Nov. 9, 2007

(65) Prior Publication Data

US 2008/0138547 A1 Jun. 12, 2008

Related U.S. Application Data

(60) Provisional application No. 60/857,783, filed on Nov. 9, 2006.

(51) Int. Cl.
*B32B 9/04* (2006.01)
*B05D 1/00* (2006.01)

(52) U.S. Cl. ........ 428/699; 428/432; 428/216; 428/446; 428/450; 428/457; 428/469; 428/472; 428/689; 428/701; 428/702; 428/704; 428/34; 427/160

(58) Field of Classification Search .................. None
See application file for complete search history.

(56) References Cited

U.S. PATENT DOCUMENTS

| | | | |
|---|---|---|---|
| 5,962,115 A | 10/1999 | Zmelty et al. | |
| 6,210,784 B1 | 4/2001 | Rondeau et al. | |
| 6,219,188 B1 * | 4/2001 | Tsukamoto | 359/629 |
| 6,770,321 B2 | 8/2004 | Hukari et al. | |
| 2005/0196632 A1 | 9/2005 | Maschwitz et al. | |
| 2005/0202254 A1 | 9/2005 | Nunez-Regueiro et al. | |
| 2005/0260419 A1 | 11/2005 | Hukari et al. | |
| 2006/0105103 A1 * | 5/2006 | Hartig | 427/209 |
| 2006/0121290 A1 | 6/2006 | Chonlamaitri et al. | |
| 2006/0134436 A1 | 6/2006 | Maschwitz | |

FOREIGN PATENT DOCUMENTS

| | | |
|---|---|---|
| EP | 0 747 330 A1 | 12/1996 |
| EP | 0 995 724 A1 | 4/2000 |
| WO | 00/15571 A1 | 3/2000 |
| WO | 00/37381 A1 | 6/2000 |

OTHER PUBLICATIONS

Al-Kuhaili, M.F., Optical properties of hafnium oxide thin films and their application in energy-efficient windows, Optical Materials, Elsevier B.V., Amsterdam, NL, vol. 27, No. 3, Dec. 2004, pp. 383-387.

* cited by examiner

*Primary Examiner* — Ling Xu
(74) *Attorney, Agent, or Firm* — Rothwell, Figg, Ernst & Manbeck, P.C.

(57) ABSTRACT

The invention discloses optical coatings with improved durability, the coating comprising a durability enhancing layer, a nucleation layer and an infrared reflecting layer. The invention also discloses methods of making thin film layers having enhanced durability.

15 Claims, 16 Drawing Sheets

OPTICAL COATING WITH IMPROVED DURABILITY

This application claims benefit of U.S. Provisional Application No. 60/857,783, filed Nov. 9, 2006, which is hereby incorporated by reference in its entirety into the present application.

FIELD OF THE INVENTION

The present invention relates generally to low emissivity ("low-e") coatings, and more particularly to coatings with enhanced mechanical and chemical durability.

BACKGROUND OF THE INVENTION

All United States patents and application Publications referred to herein are hereby incorporated by reference in their entireties. In the case of conflict, the present specification, including definitions, will control.

In the fenestration industry, it is a common practice to temper glass lites for increased strength or safety. It is also common practice to coat glass lites with sputtered, infrared (IR) reflecting or low emissivity coatings. When both operations are required for a fenestration product, it is most economical to coat untempered glass with the IR reflecting layers first then temper in a subsequent operation.

In this manufacturing sequence, the sputtered IR reflecting stack must withstand the tempering temperatures reaching approximately 700° centigrade. Most sputtered coatings suffer two forms of degradation from this heat exposure. One form of degradation consists of the formation of optical haze or light scattering due to roughening or delamination of the IR reflecting layers.

A second form of damage is loss of mechanical durability. Between the manufacturing steps of tempering a coated lite and assembly into an insulating glass unit, a washing step is typically necessary. In this step, the coating is subjected to water and mechanical brushing. Often, coatings that have undergone heat treatment are more susceptible to removal of top layers or scratching damage during the washing step than coatings that have not undergone heat treatment.

Coated articles are known in the art for use in window applications such as insulating glass (IG) window units, vehicle windows, monolithic windows, and/or the like. In certain example instances, designers of coated articles often strive for a combination of high visible transmission, low emissivity (or low emittance, or "low-e"), and/or low sheet resistance ($R_s$).

Typical solar control coatings have a layer stack that includes glass/single dielectric layer (e.g. silicon nitride)/single nucleation layer (e.g. zinc oxide)/IR reflecting layer (e.g. silver) with subsequent dielectric layers and possibly subsequent silver layers.

Unfortunately, while such layer stacks may provide efficient solar control and satisfy other desired performance characteristics, such coatings may often times be lacking in terms of: (a) corrosion resistance to acid (e.g. HCl) and/or hot and humid conditions; (b) mechanical performance such as scratch resistance; and/or (c) thermal stability upon heat treatment for tempering, heat bending, or the like (i.e., $\Delta E^*$ value(s)).

Accordingly, there exists a need in the art for coated articles that have improved characteristics with respect to (a), (b) and/or (c) compared to a conventional layer stack, but which still are capable of acceptable solar control (e.g., appropriate values of visible transmission and of solar heat gain coefficient (SHGC)), and for methods of making such articles.

SUMMARY OF INVENTION

The present invention fulfills at least one of the above-listed needs, and/or other needs which will become apparent to the skilled artisan upon reading the following disclosure.

This invention relates to improvements in IR reflecting coating layer designs that impart greater thermal and mechanical durability to heat treated thin film stacks. In embodiments of the invention, one or more durability enhancement layers comprising a metal oxide or metal oxy-nitride are provided at one or more locations within IR reflecting thin film layer stacks. The addition of a durability enhancement layer, which can be as thin as about 2 nanometers (nm), unexpectedly and significantly improves durability of heat treatable thin film, optical coatings. In embodiments of the present invention, the coating or layer system exhibits superior corrosion resistance to acids such as HCl and to hot and humid conditions, superior mechanical performance such as both wet and dry scratch resistance, and/or superior color stability (i.e., a low $\Delta E^*$ value(s)) upon heat treatment (HT) and/or low haze upon heat treatment.

The durability enhancement layers preferably include Zr oxide or Zr oxy-nitride, but may alternatively comprise an oxide or oxy-nitride of Mg, Al, Hf or mixtures or combinations of these with each other or with Zr oxide or Zr oxy-nitride. The coatings of the present invention are formed by depositing the layers onto the substrate. A preferred method includes depositing by magnetron sputtering.

DETAILED DESCRIPTION OF THE INVENTION

Figure 1:
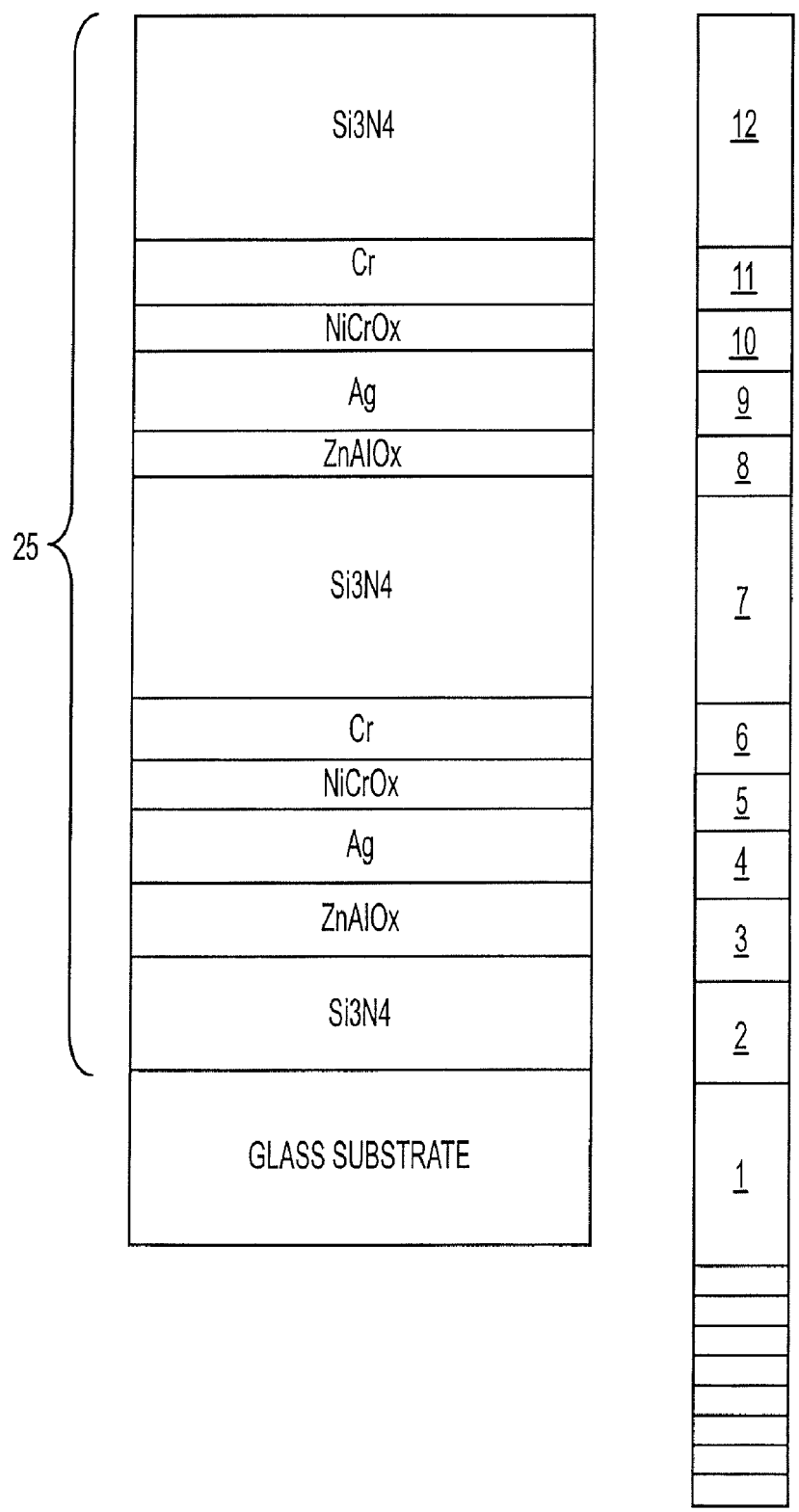
FIG. 1 depicts a cross sectional view of a coated article in accordance with articles known in the art.

In the following detailed description, reference is made to various specific embodiments in which the invention may be practiced. These embodiments are described with sufficient detail to enable those skilled in the art to practice the invention, and it is to be understood that other embodiments may be employed, and that structural and logical changes may be made without departing from the spirit or scope of the present invention.

In embodiments of the present invention, a heat treatable low-e coating or layer system is provided which includes at least one durability enhancing layer underlying a nucleation layer/IR reflecting layer sequence on a substrate. In preferred embodiments, the durability enhancing layer comprises Zr oxide or Zr oxy-nitride.

In alternate embodiments of the present invention, a heat treatable low-e coating or layer system is provided which includes at least two dielectric layers underlying the nucleation layer/IR reflecting layer sequence, wherein at least one of the layers is a durability enhancing layer, preferably comprising Zr oxide or Zr oxy-nitride.

In the embodiments described herein, the coating or layer system unexpectedly exhibits superior corrosion resistance to heat and high humidity, superior mechanical performance such as both wet and dry scratch resistance, and/or superior color stability (i.e., a low ΔE* value(s)) upon heat treatment (HT) and/or low haze upon heat treatment.

In embodiments of the present invention, it has surprisingly been found that the inclusion of at least a second dielectric layer underlying the nucleation layer unexpectedly improves the heat treatability and general durability of the coatings.

In embodiments of the present invention at least a second dielectric layer comprising, zirconium-containing oxide (e.g. $ZrO_x$ or zirconium-containing oxy-nitride (e.g., $ZrO_x N_y$) in contact with the nucleation layer, preferably a Zinc containing nucleation layer, underlying an IR reflecting layer (e.g. Ag), unexpectedly improves the heat treatability and general durability of such coatings, especially with respect to wet and dry abrasion tests and low haze after heat treatment. When the durability enhancement layer comprises ZrOxNy, the ZrOxNy layer is most effective when x<y.

In embodiments of the present invention, there is provided a coated article including a coating supported by a glass substrate, the coating comprising at least a first layer and a second layer underlying a nucleation layer which nucleation layer itself underlies an infrared (IR) reflecting layer, which preferably comprises silver. In embodiments of the present invention, the IR reflecting layer is located on the substrate over at least the first and second layers and nucleation layer wherein the first layer is a durability enhancing layer of zirconium-containing oxide or oxy-nitride and the second layer is a zinc-containing layer which is an optically effective layer substantially thicker (e.g. about 10 to 50 nm thick) than a typical zinc-containing nucleation layer (e.g. about 5 nm thick).

In embodiments of the present invention, there is provided a coated article including a coating supported by a glass substrate, the coating comprising at least a first layer and a second layer and a third layer; an infrared (IR) reflecting layer comprising silver located on the substrate over at least the first, second and third layers wherein the first layer comprises a titanium containing oxide, the second layer is a durability enhancing layer preferably comprising zirconium-containing oxide or oxy-nitride and the third layer preferably comprises a zinc-containing oxide. This zinc-containing oxide may be zinc oxide ($ZnO_x$) or may contain other materials as well such as Al (e.g., to form $ZnAlO_x$). For example, in certain example embodiments of the present invention, the zinc-containing oxide may be doped with from about 1 to 10% Al (or Sn), more preferably from about 1 to 5% Al (or Sn), and most preferably about 2 to 4% Al (or Sn). The use of a zinc-containing oxide layer under the infrared (IR) reflecting layer comprising silver allows for an excellent quality of silver to be achieved.

The combination of a zirconium-containing oxide or oxy-nitride and an optically effective layer of zinc-containing oxide in contact with an IR reflecting layer containing silver is referred to herein as a "stabilizing layer combination." This stabilizing layer combination can confer benefit to any low-e coating, including those previously known in the art, and especially to a heat treatable low-e coating.

In alternate embodiments of the present invention, there is provided a window unit (e.g., IG window unit, monolithic window, architectural glass or vehicle windshield) comprising a glass substrate which supports at least one infrared (IR) reflecting layer and at least one layer comprising zirconium-containing oxide or oxy-nitride that is heat treatable. The present invention further provides window units comprising any of the coatings/layer systems described herein.

In still further embodiments of the present invention, there is provided methods of making a coated article. Preferred methods include depositing layers described herein successively on a substrate. A method in accordance with the invention comprises providing a substrate (e.g., glass substrate); depositing a target comprising zirconium in an atmosphere comprising oxygen and nitrogen in order to form a layer comprising zirconium-containing oxide or oxy-nitride; and providing an IR reflecting layer on the substrate over or under the layer comprising zirconium-containing oxide or zirconium-containing oxy-nitride, with intervening optically effective layers of a zinc-containing oxide.

Embodiments of the invention may be described by the formula:

$$S/D_Z/(SC/D_Z \text{ or } D_i)_n/D_{top}$$

wherein:

S refers to a substrate which is preferably heat treatable and may comprise glass, fused quartz, glass ceramic, ceramic, or metal.

A first thin film dielectric layer, $D_Z$, is deposited on substrate S. $D_z$ comprises a multilayer optical interference layer which functions in part to antireflect the infrared reflecting layer. In preferred embodiments, $D_z$ comprises at least one durability enhancement layer, preferably ZrOxNy, and at least one other dielectric material not primarily comprising Zr. The other dielectric may comprise oxides, nitrides or oxy-nitrides of Mg, Al, Si, Ti, Fe, Zn, Nb, In, Sn, Ta or mixtures of these. The materials of this layer may be sub-stoichiometric or stoichiometric.

$D_i$ refers to an optional thin film dielectric optical interference layer which may comprise multiple layers or a single layer. $D_i$ may comprise oxides, nitrides or oxy-nitrides of Mg, Al, Si, Ti, Fe, Zn, Nb, In, Sn, Ta or mixtures but preferably not Zr. The materials of this layer may be sub-stoichiometric or stoichiometric.

$D_{top}$ refers to an outer optical interference layer which in part antireflects the IR reflecting layer(s). $D_{top}$ may comprise one or more layers and is typically the outermost layer of the low-e stack. It may be stoichiometric or sub-stoichiometric and comprise oxides, nitrides or oxy-nitrides of Mg, Al, Si, Ti, Fe, Zn, Nb, In, Sn, Ta or mixtures thereof. $D_{top}$ preferably comprises SiAlOxNy. $D_{top}$ may include a scratch reduction layer, such as carbon, or ZrOxNy as an outermost layer. When ZrOxNy is deposited in the outermost position, it does not enhance thermally generated haze and does not contribute to the heat treatability of a heat reflecting stack. Although, comprising the same material and/or similar thickness as the internally located ZrOxNy layer, the properties it imparts to the stack are not the same as an internally positioned ZrOxNy.

SC refers to a Sub-Composite layer structure preferably comprising a nucleation layer/infrared reflecting layer/protective barrier layer. This sub-composite layer structure is used in the majority of heat reflecting stacks at least once. Less frequently it may comprise an infrared reflecting layer/protective barrier layer or just a heat reflecting layer. The nucleation layer serves to enhance the infrared reflection properties and to increase corrosion resistance of the infrared reflecting metal, particularly when such metal is or comprises silver. The nucleation layer typically comprises zinc oxide and may comprise 1%-5% percent aluminum or 1-15% tin. The nucleation layer thickness is typically about 5-12 nanometers.

The infrared reflective layer within the sub-composite may comprise Ag, Au, Cu, Ag, TiN, ZrN. Typically it comprises Ag and is 7 to 20 nm thick.

The barrier layer of the sub-composite is typically deposited to protect Ag from the deposition process of subsequent dielectrics and improve the durability and layer adhesion of the heat reflecting stack. Thickness is typically about 0.3 to 4 nanometers. Barrier materials typically comprise a transition metal or metal alloy either in metallic, sub-oxide or sub-nitride chemical state.

In the layer formula above, n refers to an integer from 0 to 4 or, more preferably, 0 to 2.

In embodiments of the present invention, the durability enhancement layers preferably include Zr oxide or oxy-nitride, but may alternatively comprise an oxide or oxy-nitride of Mg, Al, Hf or mixtures or combinations of these with each other or with Zr oxide or oxy-nitride.

The present invention further provides methods of making the thin film layer stacks having durability enhancement layers as described herein, the methods including depositing on a substrate the described coatings. The layers in the multilayer coatings of the present invention can be deposited by conventional physical and chemical vapor deposition techniques. The details of these techniques are well known in the art and will not be repeated here. Suitable deposition techniques include sputtering methods. Suitable sputtering methods include DC sputtering, using metallic targets, and AC and RF sputtering, using metallic and non-metallic targets. All can utilize magnetron sputtering. The sputtering can be in an inert gas, or can be carried out reactively in reactive gas. The total gas pressure can be maintained in a range from $5 \times 10^{-4}$ to $8 \times 10^{-2}$ mbar, preferably from $1 \times 10^{-3}$ to $1 \times 10^{-2}$ mbar. Sputtering voltages can be in a range from 200 to 1200 V, preferably 250 to 1000 V. Dynamic deposition rates can be in a range of from 25 to 4000 nm-mm$^2$/W-sec, preferably 30 to 700 nm-mm$^2$/W-sec. The Terra G Coater manufactured by Applied Materials as well as coaters manufactured by Leybold Systems GmbH with model numbers Typ A 2540 Z 5H/13-22 and Typ A 2540 Z 5H/20-29 are examples of equipment suitable for sputter depositing the multilayer coatings of the present invention.

As used in the present specification, the language "deposited onto" or "deposited on" means that the substance is directly or indirectly applied above the referenced layer. If applied indirectly, one or more layers may intervene. Furthermore, unless otherwise indicated, in describing coatings of the present invention by use of the format "[substance 1]/[substance 2]/[substance 3]/ . . . " or the format "a first [substance 1] layer; a first [substance 2] layer; a second [substance 1] layer; a second [substance 2] layer; . . . ", or the like, it is meant that each successive substance is directly or indirectly deposited onto the preceding substance.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_x$ Y or $R_x$ (i.e. the RY value refers to photopic reflectance or in the case of TY photopic transmittance), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB 1976 a*, b* coordinates and scale (i.e. the CIE 1976 a*b* diagram, D65 10 degree observer), wherein:

L* is (CIE 1976) lightness units a* is (CIE 1976) red-green units b* is (CIE 1976) yellow-blue units.

Other similar coordinates may be equivalently used such as by the subscript "h" to signify the conventional use of the Hunter method (or units) Ill. C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-95, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emissivity" (or emittance) and "transmittance" are well understood in the art and are used herein according to their well known meaning. Thus, for example, the term "transmittance" herein means solar transmittance, which is made up of visible light transmittance (TY of $T_{vis}$) infrared energy transmittance ($T_{IR}$), and ultraviolet light transmittance ($T_{uv}$) Total solar energy transmittance (TS or $T_{solar}$) can be characterized as a weighted average of these other values. With respect to these transmittances, visible transmittance may be characterized for architectural purposes by the standard Ill. D65 10 degree technique; while visible transmittance may be characterized for automotive purposes by the standard Ill. A 2 degree technique (for these techniques, see for example ASTM E-308-95, incorporated herein by reference). For purposes of emissivity a particular infrared range (i.e. 2,500-40,000 nm) is employed.

"Emissivity" (or emittance) ("E" or "e") is a measure, or characteristic of both absorption and reflectance of light at given wavelengths. It is usually represented by the formula: $E = 1 - Reflectance_{film}$. For architectural purposes, emissivity values become quite important in the so-called "mid-range", sometimes also called the "far range" of the infrared spectrum, i.e. about 2,500-40,000 nm., for example, as specified by the WINDOW 4.1 program, LBL-35298 (1994) by Lawrence Berkeley Laboratories, as referenced below. The term "emissivity" as used herein, is thus used to refer to emissivity values measured in this infrared range as specified by ASTM Standard E 1585-93 entitled "Standard Test Method for Measuring and Calculating Emittance of Architectural Flat Glass Products Using Radiometric Measurements". This Standard, and its provisions, are incorporated herein by reference. In this Standard, emissivity is reported as hemispherical emissivity ($E_h$) and normal emissivity ($E_n$).

The actual accumulation of data for measurement of such emissivity values is conventional and may be done by using, for example, a Beckman Model 4260 spectrophotometer with "VW" attachment (Beckman Scientific Inst. Corp.). This spectrophotometer measures reflectance versus wavelength, and from this, emissivity is calculated using the aforesaid ASTM Standard 1585-93.

The term $R_{solar}$ refers to total solar energy reflectance (glass side herein), and is a weighted average of IR reflectance, visible reflectance, and UV reflectance. This term may be calculated in accordance with the known DIN 410 and ISO 13837 (December 1998) Table 1, p. 22 for automotive applications, and the known ASHRAE 142 standard for architectural applications, both of which are incorporated herein by reference.

"Haze" is defined as follows. Light diffused in many directions causes a loss in contrast. The term "haze" is defined herein in accordance with ASTM D 1003 which defines haze as that percentage of light which in passing through deviates from the incident beam greater than 2.5 degrees on the average. "Haze" may be measured herein by a Byk Gardner haze meter (all haze values herein are measured by such a haze meter and are given as a percentage of light scattered).

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emissivity as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". Chemical durability is determined by an immersion test wherein a 2"×5" or 2"×2" sample of a coated glass substrate is immersed in about 500 ml of a solution containing 4.05% NaCl and 1.5% $H_2O_2$ for 20 minutes at about 36° C.

Climatic Chamber Set Up

"Chemical durability or corrosion resistance may also be determined by exposure to heat and high humidity. Samples are cut down to 4"×6" for this test. For the humidity test, humidity is held a 98% relative humidity (RH) while the temperature cycles between 45° and 55° C. in one hour.

Measurements Performed

Samples are removed after 1, 3, and 7 days of exposure for measurements. Haze, emissivity, and film side reflection are measured.

To calculate delta haze:

Delta Haze=Post-Test Haze−Pre-Test Haze

To calculate delta E:

Delta $E$=(delta $L^{*\wedge}2$+delta $a^{*\wedge}2$+delta $b^{*\wedge}2$)½, where the delta $L$, $a^*$, and $b^*$ are pre-test minus post-test measurements.

To calculate percent change in emissivity use this formula:

Change in emissivity=($E$ post-test−$E$ pre-test)/($E$g-lass−$E$pre-test).

"Mechanical durability" as used herein is defined by the following test. The test uses a Erichsen Model 494 brush tester and Scotch Brite 7448 abrasive (made from SiC grit adhered to fibers of a rectangular pad) wherein a standard weight brush or a modified brush holder is used to hold the abrasive against the sample. 100-500 dry or wet strokes are made using the brush or brush holder. Damage caused by scratching can be measured in three ways: variation of emissivity, haze and E for film side reflectance. This test can be combined with the immersion test or heat treatment to make the scratches more visible. Good results can be produced using 200 dry strokes with a 135 g load on the sample. The number of strokes could be decreased or a less aggressive abrasive could be used if necessary. This is one of the advantages of this test, depending on the level of discrimination needed between the samples, the load and/or the number of strokes can be adjusted. A more aggressive test could be run for better ranking. The repeatability of the test can be checked by running multiple samples of the same film over a specified period.

The terms "heat treatment" and "heat treating" as used herein mean heating the article to a temperature sufficient to enable thermal tempering, bending, or heat strengthening of the glass inclusive article. This definition includes, for example, heating a coated article to a temperature of at least about 1100 degrees F. (e.g., to a temperature of from about 550 degrees C. to 900 degrees C.) for a sufficient period to enable tempering, heat strengthening, or bending.

The term "Solar Heat Gain Coefficient (or SHGC)" ("g") is well known in the art and refers to a measure of the total solar heat gain through a window system relative to the incident solar radiation.

Unless otherwise indicated, the additional terms listed below are intended to have the following meanings in this specification.

| | |
|---|---|
| Ag | silver |
| $TiO_2$ | titanium dioxide |
| $NiCrO_x$ | an alloy or mixture containing nickel oxide and chromium oxide. Oxidation states may vary from stoichiometric to substoichiometric. |
| NiCr | an alloy or mixture containing nickel and chromium |
| $SiAlN_x$ or $SiN_x$ | reactively sputtered silicon aluminum nitride. Sputtering target typically contains 1-20 weight % Al. The sputtering gas is a mixture of Ar and $N_2$. Dependant on the gas mixture and the sputtering power, the material is more or less absorbing. |
| $SiAlN_xO_y$ or $SiN_xO_y$ | reactively sputtered silicon aluminum oxy-nitride. Sputtering target typically contains 1-20 weight % Al. The sputtering gas is a mixture of Ar, $N_2$ and $O_2$. Dependant on the gas mixture and the sputtering power, the material is more or less absorbing. |
| $ZnAl_yO_x$ | reactively sputtered Zn aluminum oxide. Sputtering target typically contains 1-20 weight % Al. The sputtering gas is a mixture of Ar and $O_2$. |

-continued

| | |
|---|---|
| $Zn_xSn_yAl_zO_w$ | reactively sputtered zinc tin (aluminum) oxide. Sputtering target typically a zinc tin alloy with optional Al doping. The zinc tin alloy covers a wide range from zinc rich to tin rich alloys. The sputtering gas is a mixture of Ar and $O_2$. |
| Zr | zirconium |
| optical coating | one or more coatings applied to a substrate which together affect the optical properties of the substrate |
| low-e stack | transparent substrate with a low emissivity optical coating consisting of one or more layers |
| barrier | layer deposited to protect another layer during processing, especially a heat reflecting silver layer. may provide better adhesion of upper layers, may or may not be present after processing. |
| layer | a thickness of material having a function and chemical composition bounded on each side by an interface with another thickness of material having a different function and/or chemical composition. Deposited layers may or may not be present after processing due to reactions during processing. "Layer," as used herein, encompasses a thickness of material that may be bounded on a side by air or the atmosphere (such as, for example, the top layer or protective overcoat layer in a coating stack or surmounting the other layers in the stack). |
| wet brush test | This term, as used in the Example sets provided herein, refers (unless otherwise noted) to a wet brush durability test carried out on an Erichsen brush tester (Model 494) using a nylon brush (Order number 0068.02.32. The brush weighs 450 grams. The individual bristle diameter is 0.3 mm. Bristles are arranged in groups with a diameter of 4 mm). The test is run for 1000 strokes (where one stroke is equal to a full cycle of one back and for motion of the brush). The samples are brushed on the coated side and submerged in de-ionized water during the brushing procedure. |

Referring now to the drawings in which like reference numerals indicate like parts throughout the several views.

In the drawings, example layers of or including zirconium-containing oxide or zirconium-containing oxy-nitride are referred to by reference numerals 13, 16, 17 and 19.

Coated articles described herein may be used in coated article applications such as monolithic windows, IG window units, vehicle windows, architectural glass and/or any other suitable application that includes single or multiple substrates, such as glass substrates. For example, a typical refrigeration door or freezer door is comprised of an insulating glass unit (IGU) housed in a door frame. The IGU in a refrigeration door is, typically, comprised of two or three sheets of glass sealed at their peripheral edges by a sealant assembly, generally referred to as an edge seal. In an IGU comprised of three sheets of glass, two insulating chambers are formed between the three sheets of glass. In an IGU comprised of two sheets of glass, a single insulating chamber is formed. Typically, IGUs for refrigerators are constructed of two sheets of glass, while IGUs for freezers employ three sheets of glass.

Embodiments of the present invention relate to a coated article which includes at least one glass substrate supporting a coating. The coating typically has at least one infrared (IR) reflecting layer which reflects and/or blocks at least some IR radiation. The IR reflecting layer(s) may be of a material such as silver, gold, NiCr or the like. Often, an IR reflecting layer is sandwiched between at least first and second dielectric layers of the coating. In certain example embodiments of the present invention, it has surprisingly been found that the inclusion of a layer consisting essentially of, or comprising, zirconium-containing oxide ($ZrO_x$) or zirconium-containing oxy-nitride (e.g., $ZrO_x N_y$) as a dielectric layer(s) of such a coating underlying a zinc containing layer in contact with an IR reflecting layer unexpectedly improves the aforementioned heat treatability and durability of the coating.

One or more such zirconium-containing oxide or zirconium-containing oxy-nitride layers in contact with a zinc-containing layer may be provided in a given coating in different embodiments of this invention. Moreover, such zirconium-containing oxide or zirconium-containing oxy-nitride layer(s) in contact with Zinc containing layers may be provided in any type of solar control or low-E (low-emissivity, or low-emittance) coating in different embodiments of this invention, and the specific low-E coatings described herein are for purposes of example only.

In certain example embodiments of the present invention, zirconium-containing oxide or zirconium-containing oxy-nitride may be used to replace or partially replace a layer of silicon nitride, or as an additional layer directly on top of or directly under a layer of or comprising silicon nitride. The use of a layer of zirconium-containing oxide or zirconium-containing oxy-nitride in this respect has surprisingly been found to improve chemical stability and heat stability, and zirconium-containing oxide or zirconium-containing oxy-nitride has also been found to be stable during sputtering processing.

In certain example embodiments of the present invention, the oxygen and/or nitrogen content of the zirconium-containing oxide or zirconium-containing oxy-nitride layer(s) is adjusted so that the zirconium-containing oxide or zirconium-containing oxy-nitride inclusive layer has the optical properties required to achieve the overall optical specifications of the coating such as transmittance, reflectance and transmitted and reflected color.

FIG. 1 depicts a cross sectional view of a coated article in accordance with those known in the art. The coated article includes glass substrate 1 (e.g., clear, green, bronze, or blue-green glass substrate from about 1.0 to 10.0 mm thick, more typically from about 1.0 mm to 6.0 mm thick), and a multi-layer coating (or layer system) deposited on the substrate either directly or indirectly. In the embodiment shown in FIG. 1, the coating 25 comprises dielectric layer 2, zinc inclusive layer 3, IR reflecting layer 4 including or of silver, gold, or the like, upper contact layer 5 of or including an oxide of nickel chrome (e.g., $NiCrO_x$), a metal layer 6 (e.g. Cr) dielectric layer 7 (e.g. $Si_3N_4$). Layers 8, 9, 10 and 11 follow in similar manner to layers 3, 4, 5 and 6. A dielectric layer 12 (e.g. $Si_3N_4$), which may in certain example instances be a protective overcoat, surmounts the stack. A further protective overcoat (not shown) of $ZrO_x$ or $ZrO_x NY$ may be deposited over layer 12.

Figure 2:
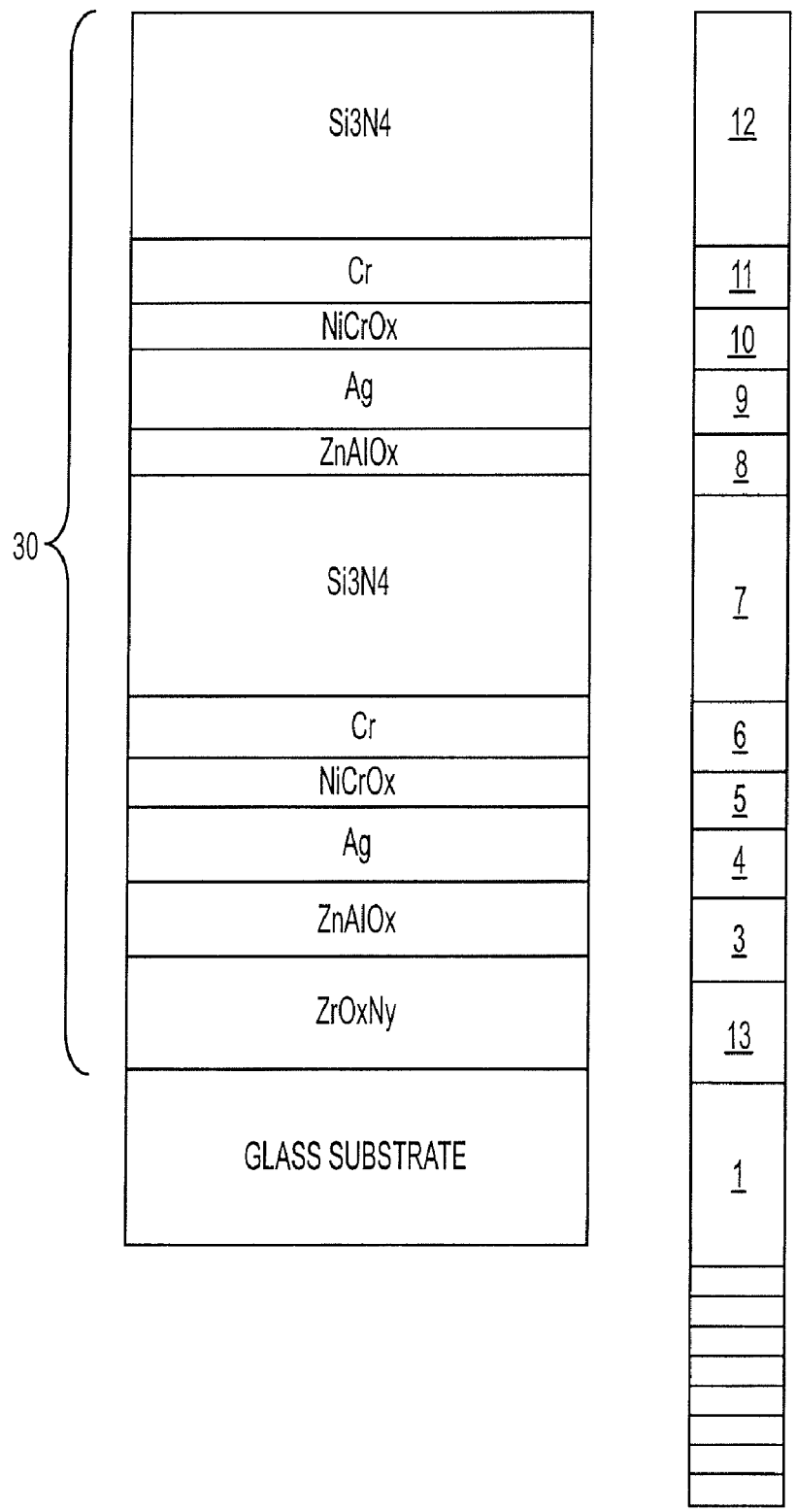
FIG. 2 depicts a cross sectional view of a coated article in accordance with an embodiment of the present invention.

FIG. 2 depicts a side cross sectional view of a coated article according to a non-limiting embodiment of this invention. The coated article includes glass substrate 1 (e.g., clear, green, bronze, or blue-green glass substrate from about 1.0 to 10.0 mm thick, more preferably from about 1.0 mm to 6.0 mm thick), and a multi-layer coating (or layer system) provided on the substrate either directly or indirectly. In the embodiment shown in FIG. 2, the coating 30 contains zirconium-containing oxide ($ZrO_x$) or zirconium-containing oxy-nitride ($ZrO_x N_y$) layer 13 in contact with zinc inclusive layer 3 which itself is in contact with IR reflecting layer 4 including or of silver, gold, or the like followed by upper contact layer 5 of or including an oxide of nickel chrome (e.g., $NiCrO_x$), a metal layer 6 (e.g. Cr) and a dielectric layer 7 (e.g. Si3N4). Layers 8, 9, 10 and 11 follow in similar manner to layers 3, 4, 5 and 6.

A dielectric layer 12 (e.g. $Si_3N_4$), which may in certain example instances be a protective overcoat, surmounts the stack. A further protective overcoat (not shown) of $ZrO_x$ or $ZrO_xN_y$ may be deposited over layer 12.

Infrared (IR) reflecting layers 4 and 9 are preferably substantially or entirely metallic and/or conductive, and may comprise silver (Ag), gold, or any other suitable IR reflecting material. IR reflecting layers 4 and 9 help allow the coating to have low-E and/or good solar control characteristics such as low emittance, low sheet resistance, and so forth. The IR reflecting layers 4 and 9 may, however, be slightly oxidized in certain embodiments of this invention. In order to achieve low sheet resistivity it has been found beneficial to deposit silver on a suitable nucleation layer, such as, for example, a zinc-containing layer with at least partially crystalline properties.

Figure 3:
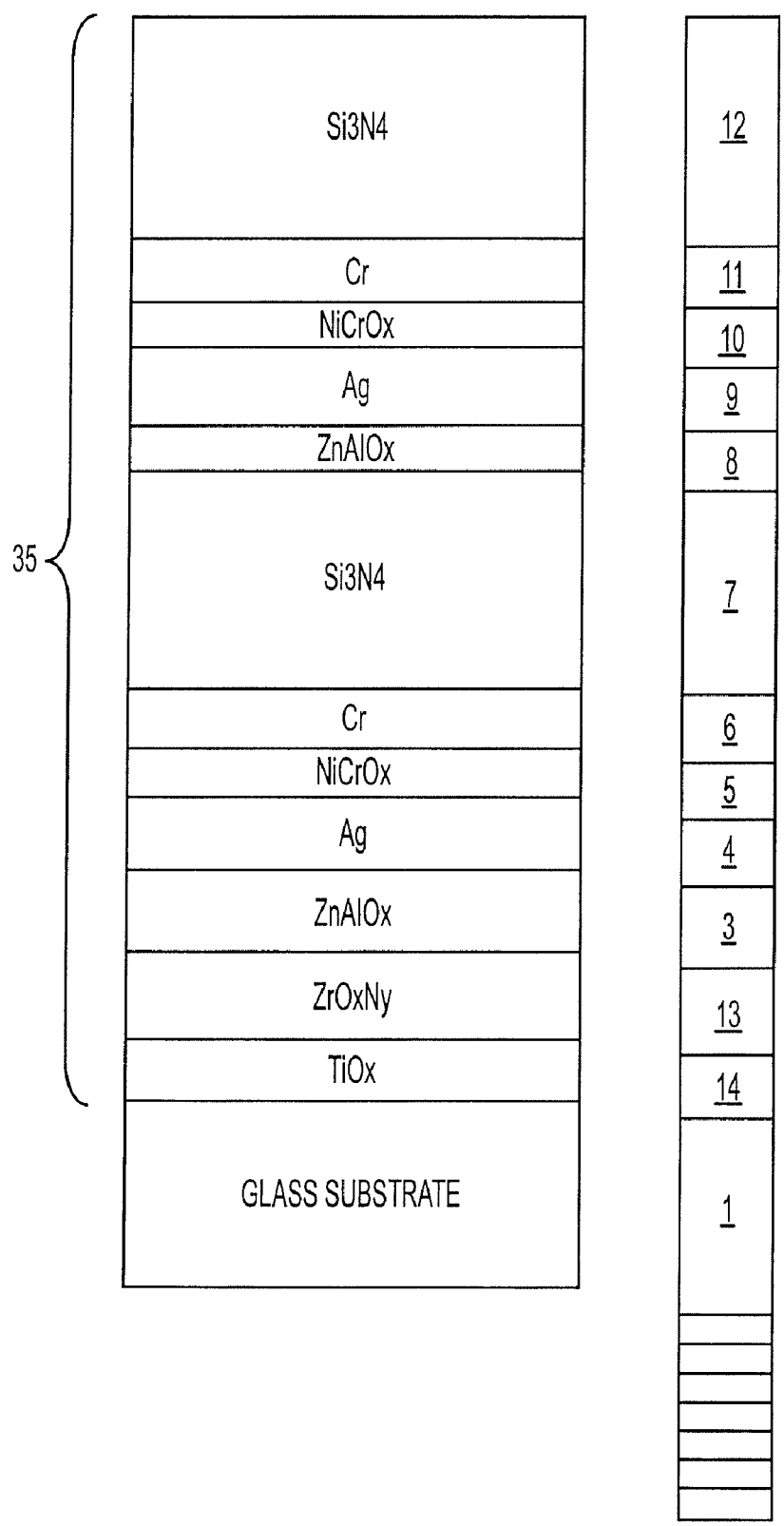
FIG. 3 depicts a cross sectional view of a coated article in accordance with an embodiment of the present invention.

FIG. 3 shows an embodiment, for purposes of example only, in which (compared to the stack 30 of FIG. 2) the coating stack 35 contains an extra titanium oxide containing layer 14 deposited directly on the glass substrate and the stabilizing layer combination of/a zirconium-containing oxide or oxy-nitride/a zinc-containing oxide/an IR reflecting layer containing silver/is deposited on top of titanium oxide containing layer 14. This combination may, under certain deposition conditions of the various layers, provide a product which has very low haze after heat treatment for tempering or other purposes.

The contact layers 5 and 10 above the silver layers 4 and 9 may be of or include an oxide of Ni and/or Cr. In certain example embodiments, upper contact layers 5 and 10 may be of or include nickel (Ni) oxide, chromium/chrome (Cr) oxide, or a nickel alloy oxide such as nickel chrome oxide (NiCrOx), or other suitable material(s). The use of, for example, NiCrOx in this layer allows durability to be improved in certain example instances. The NiCrOx layers 5 and 10 may be fully oxidized in certain embodiments of this invention (i.e., fully stoichiometric), or alternatively may only be partially oxidized. In some embodiments, the NiCrOx layers 5 and 10 may be at least about 50% oxidized.

Dielectric layer 12, which may be an overcoat in certain embodiments, may be of or include silicon nitride (e.g., Si3N4) or any other suitable material, such as silicon oxy-nitride, in certain example embodiments of this invention. Optionally, other layers may be provided above layer 12. For example, a zirconium-containing oxide or oxy-nitride layer may be used for additional abrasion and corrosion control. Such layers include, for example, ZrOx or ZrOx Ny protective coatings, as described in U.S. Patent Application Publications 2006/0134436, 2005/0260419, and 2005/0196632, and U.S. Pat. No. 6,770,321, each of which is incorporated by reference herein in its entirety. Layer 12 is provided for durability purposes, and to protect the underlying layers.

Figure 4:
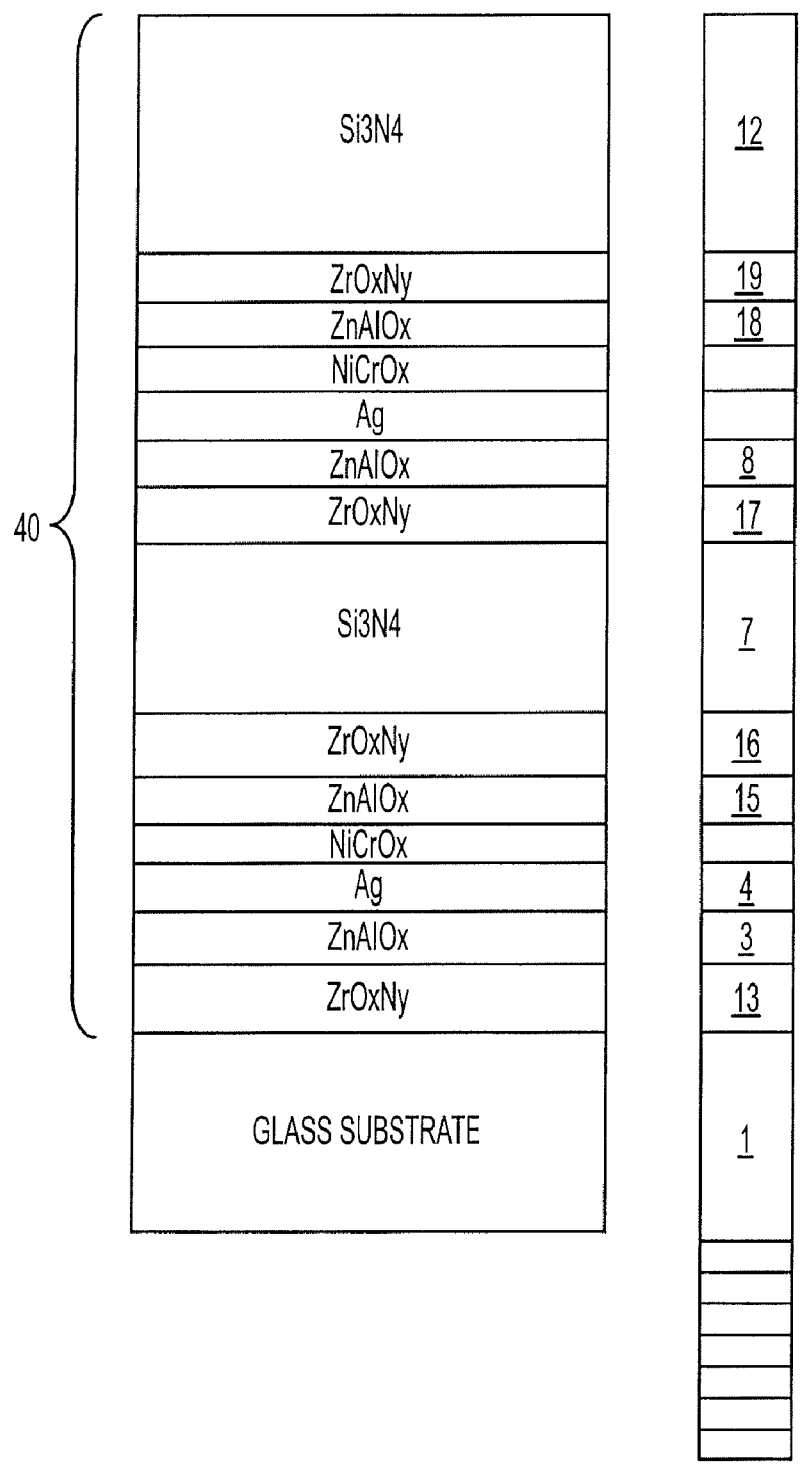
FIG. 4 depicts a cross sectional view of a coated article in accordance with an embodiment of the present invention.

FIG. 4 shows an embodiment, for purposes of example only, which has stabilizing layer pairing/zirconium-containing oxide or oxy-nitride/zinc-containing oxide/both below and above each infrared (IR) reflecting layer 4 and 9 shown in this example as silver. The stabilizing layer pairs are (13, 3), (15, 16), (17, 8) and (18, 19)

Figure 5:
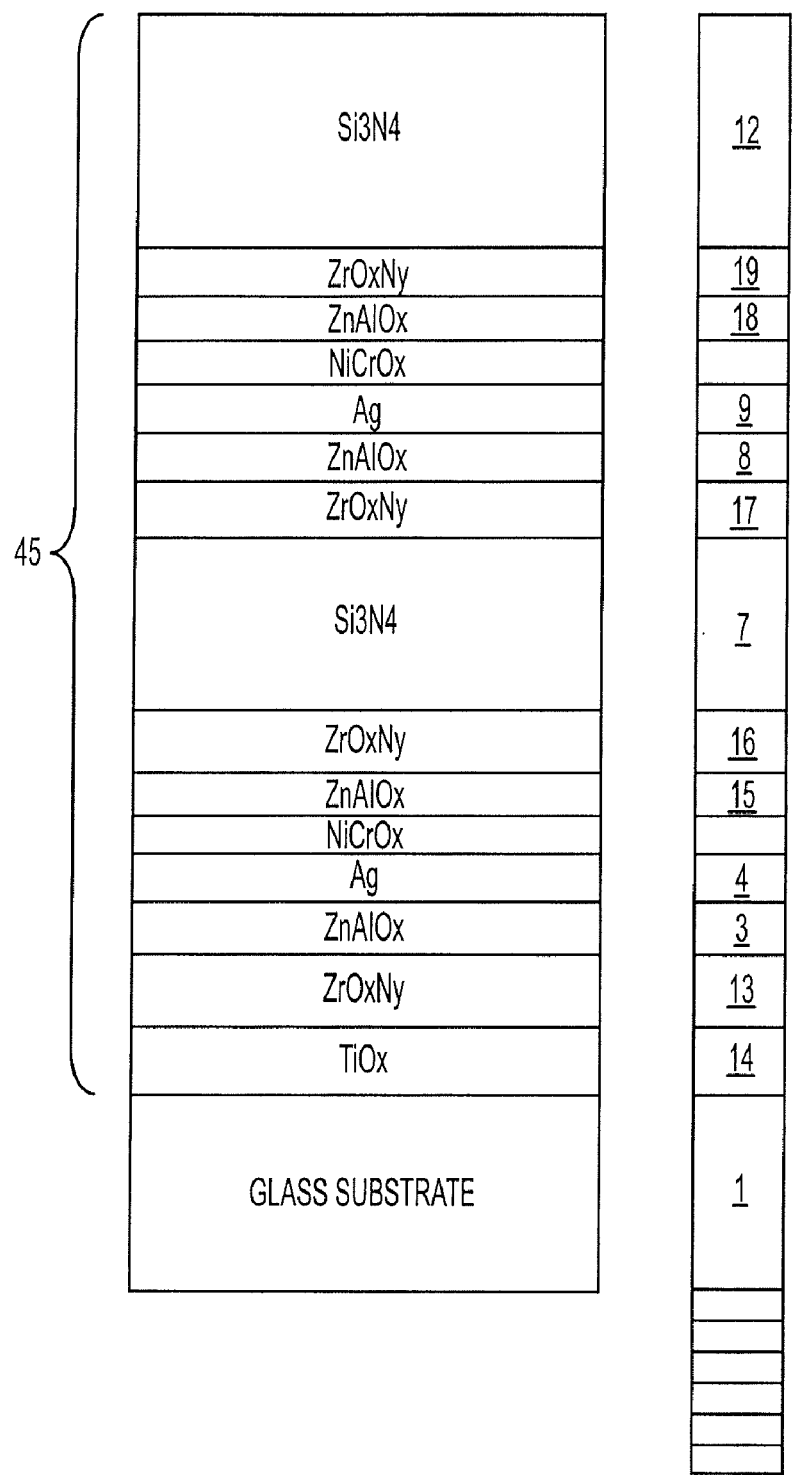
FIG. 5 depicts a cross sectional view of a coated article in accordance with an embodiment of the present invention.

FIG. 5 shows an embodiment, for purposes of example only, where (compared to the stack 35 of FIG. 4) the coating stack 45 contains an extra titanium oxide containing layer 14 deposited directly on the glass substrate. A stabilizing layer combination of/a zirconium-containing oxide or oxy-nitride/a zinc-containing oxide/an IR reflecting layer containing silver/is deposited on top of titanium oxide containing layer 14. This combination may under certain deposition conditions of the various layers, provide a product which has very low haze after heat treatment for tempering or other purposes.

Other layer(s) below or above the stabilizing layer combination may also be provided. Thus, while the layer system or coating is "on" or "supported by" substrate 1 (directly or indirectly), other layer(s) may be provided therebetween. Thus, for example, the coating of FIG. 2 may be considered "on" and "supported by" the substrate 1 even if other layer(s) are provided between the stabilizing layer combination (13, 3) and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate 1 in the FIG. 2 embodiment are as follows, from the glass substrate outwardly:

| | |
|---|---|
| ZrOx Ny | about 5 to about 30 nm, preferably about 10 to about 20 nm |
| ZnAlOx | about 3 to about 10 nm, preferably about 5 to about 8 nm |
| Ag | about 9 nm to about 14 nm |
| NiCrOx | about 1.5 nm to about 4 nm |
| Cr | about 2.5 nm to about 7 nm |
| Si3N4 | about 50 nm to about 75 nm |
| ZnAlOx | about 5 nm to about 8 nm |
| Ag | about 10.5 nm to about 17 nm |
| NiCrOx | about 1.5 nm to about 4 nm |
| Cr | about 1.5 nm to about 5 nm |
| Si3N4 | about 15 nm to about 30 nm |

The thicknesses of the layers noted above are exemplary only.

FIGS. 6, 7, 8, and 12 depict cross sectional views of coated articles in accordance with those known in the art of heat reflecting stacks. These coatings typically cannot undergo heat treatment without severe damage to their optical and mechanical properties.

Figure 6:
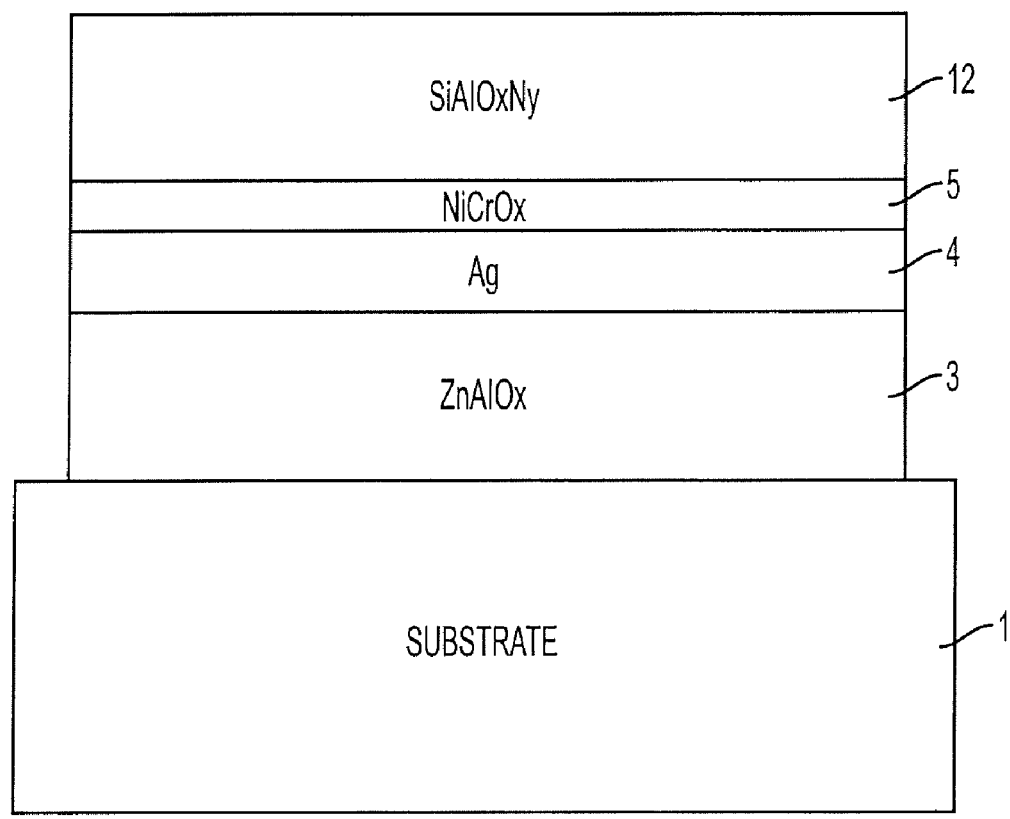
FIG. 6 depicts a cross sectional view of a coated article in accordance with those known in the art.
Figure 9:
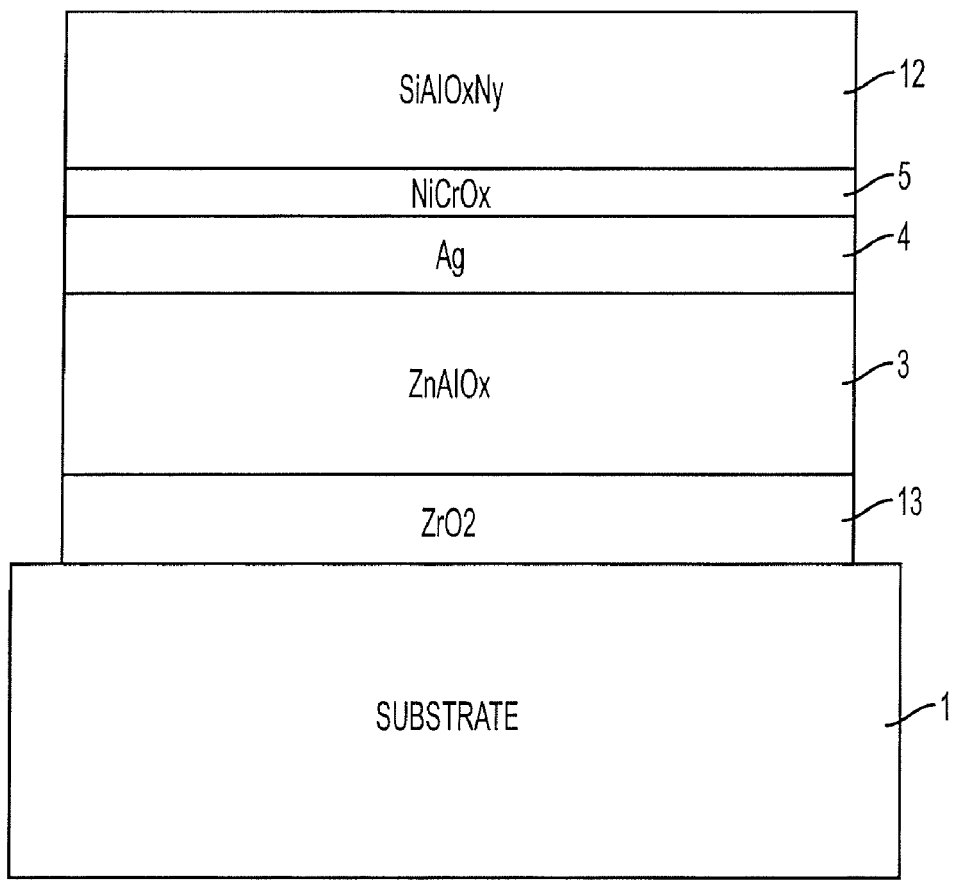
FIG. 9 depicts a cross sectional view of the coated article in FIG. 6 modified for undergoing heat treatment without suffering damage.

FIG. 9 depicts a cross sectional view of a coated article similar to that in FIG. 6, but modified in accordance with the invention to allow it to undergo heat treatment without suffering the damage seen in the prior art coatings. The coated article depicted in FIG. 9 includes substrate 1, which is preferably glass, but may comprise quartz, ceramic, or other materials. In this embodiment, durability enhancement layer 13 comprises zirconium oxide, which is preferably about 2 nm to about 8 nm thick, more preferably about 3 nm to about 5 nm. First dielectric 3 in this embodiment comprises a dielectric, such as zinc oxide, tin oxide, aluminum oxide, or combinations of these materials. Typical thickness may be from about 15 nm to about 35 nm, preferably from about 20 nm to about 30 nm. This first dielectric 3 may also function as a nucleation layer for the infrared reflecting layer 4. In other variations, a nucleation layer may be added. A contact or barrier layer 5 typically comprising a transition metal, transition metal oxide, transition metal nitride or mixture of these materials is also included in this embodiment as is an outermost dielectric 12.

Figure 7:
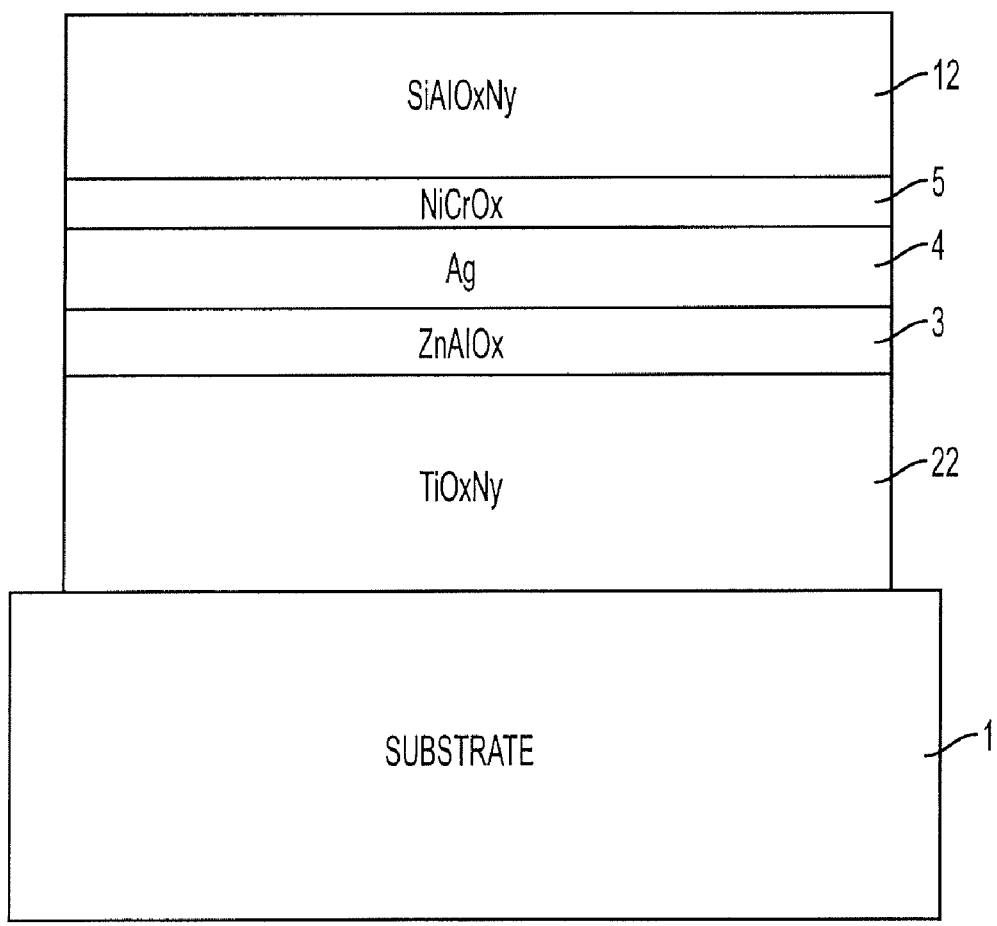
FIG. 7 depicts a cross sectional view of a coated article in accordance with articles known in the art.
Figure 10:
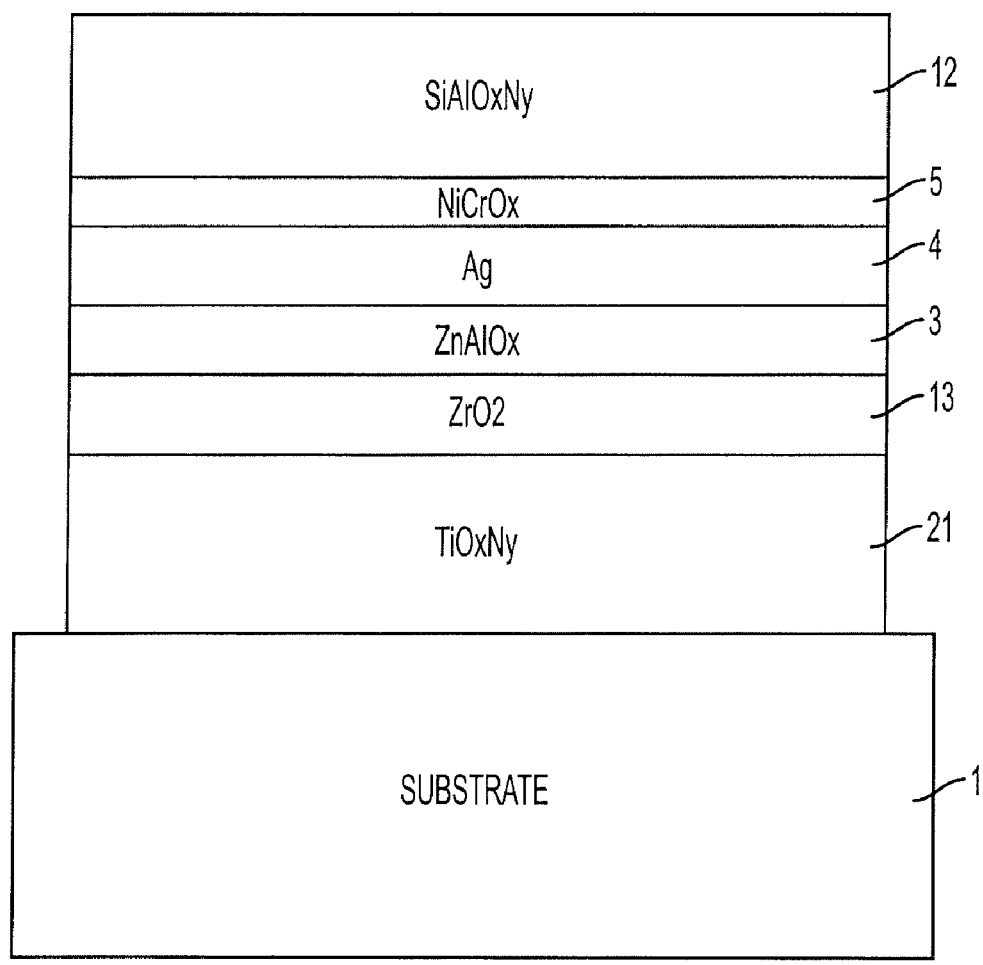
FIG. 10 depicts a cross sectional view of the coated article in FIG. 7, modified to undergo heat treatment without suffering damage.

FIG. 10 depicts a cross sectional view of a coated article similar to that in FIG. 7, but modified in accordance with the invention to allow it to undergo heat treatment without suffering damage. This coated article includes substrate 1, which is typically glass, but may comprise quartz, ceramic, or other materials. First dielectric 21 may comprise a material such as titanium oxide, niobium oxide, titanium oxy-nitride, or niobium oxy-nitride. Preferably, the dielectric material is predominantly an oxide. Typical thickness may be from about 11 nm to about 26 nm, preferably from about 16 nm to about 21 nm. Durability enhancement layer 13, in the illustrated embodiment, comprises zirconium oxide. This layer is preferably about 2 nm to about 10 nm thick, more preferably about 4 nm to about 8 nm. This embodiment includes a nucleation layer 3, infrared reflecting layer 4, and a contact or barrier layer 5 typically comprising a transition metal, transition metal oxide, transition metal nitride or mixture of these materials. An outermost dielectric layer 12 is also present.

Figure 8:
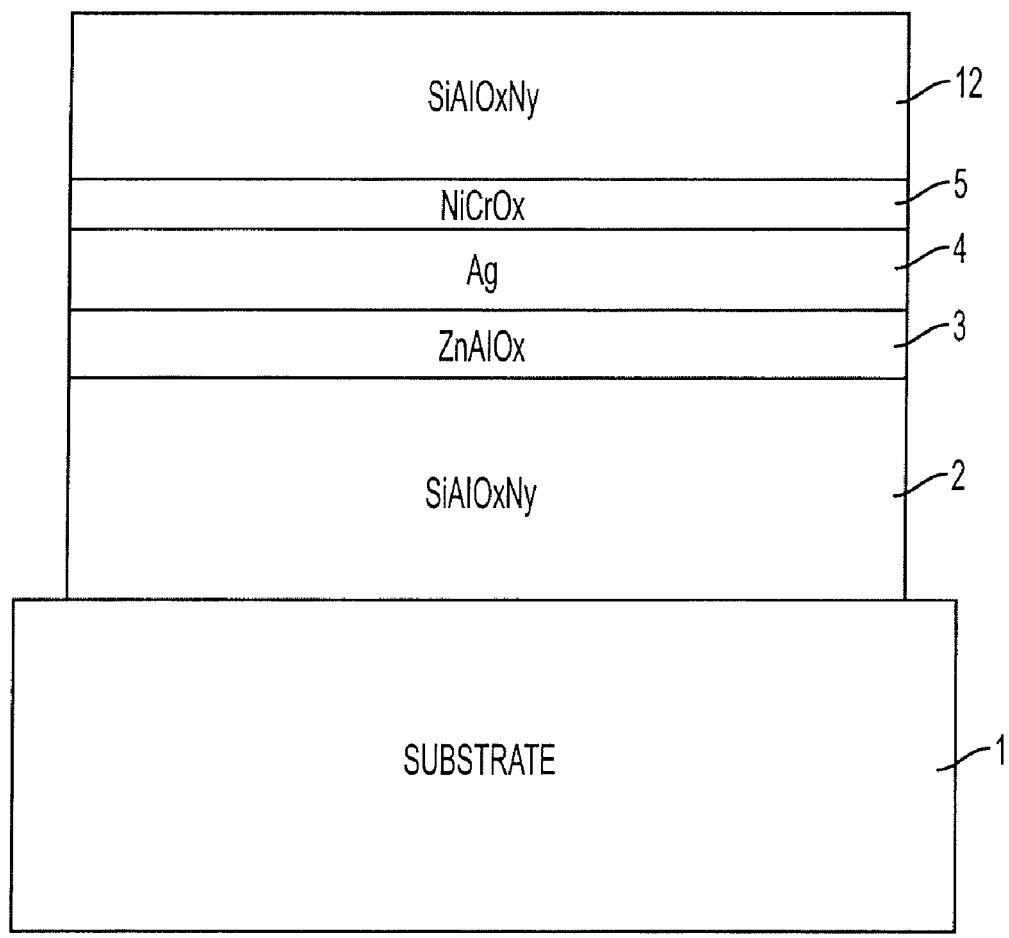
FIG. 8 depicts a cross sectional view of a coated article in accordance with articles known in the art.
Figure 11:
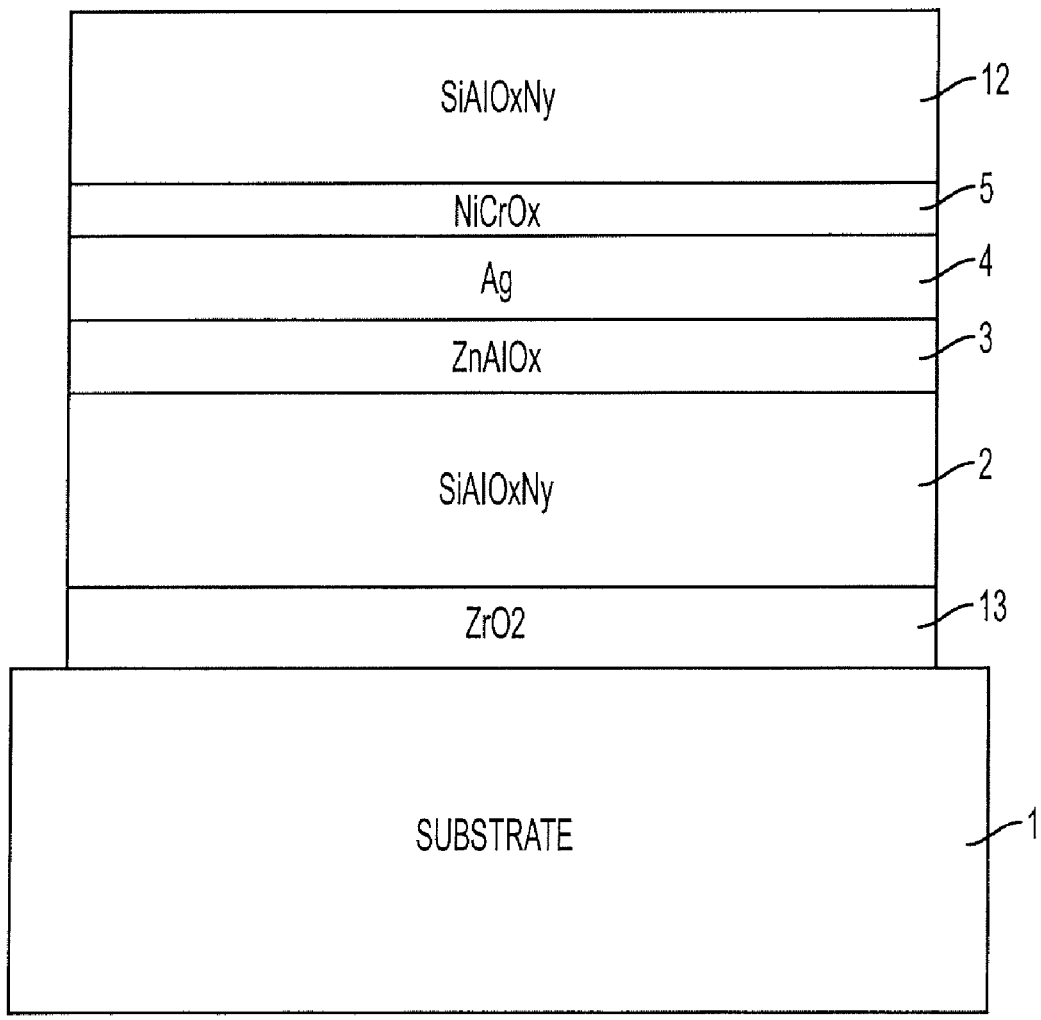
FIG. 11 depicts a cross sectional view of the coated article in FIG. 8, modified to undergo heat treatment to achieve superior mechanical durability as compared to the coating of FIG. 8.
Figure 12:
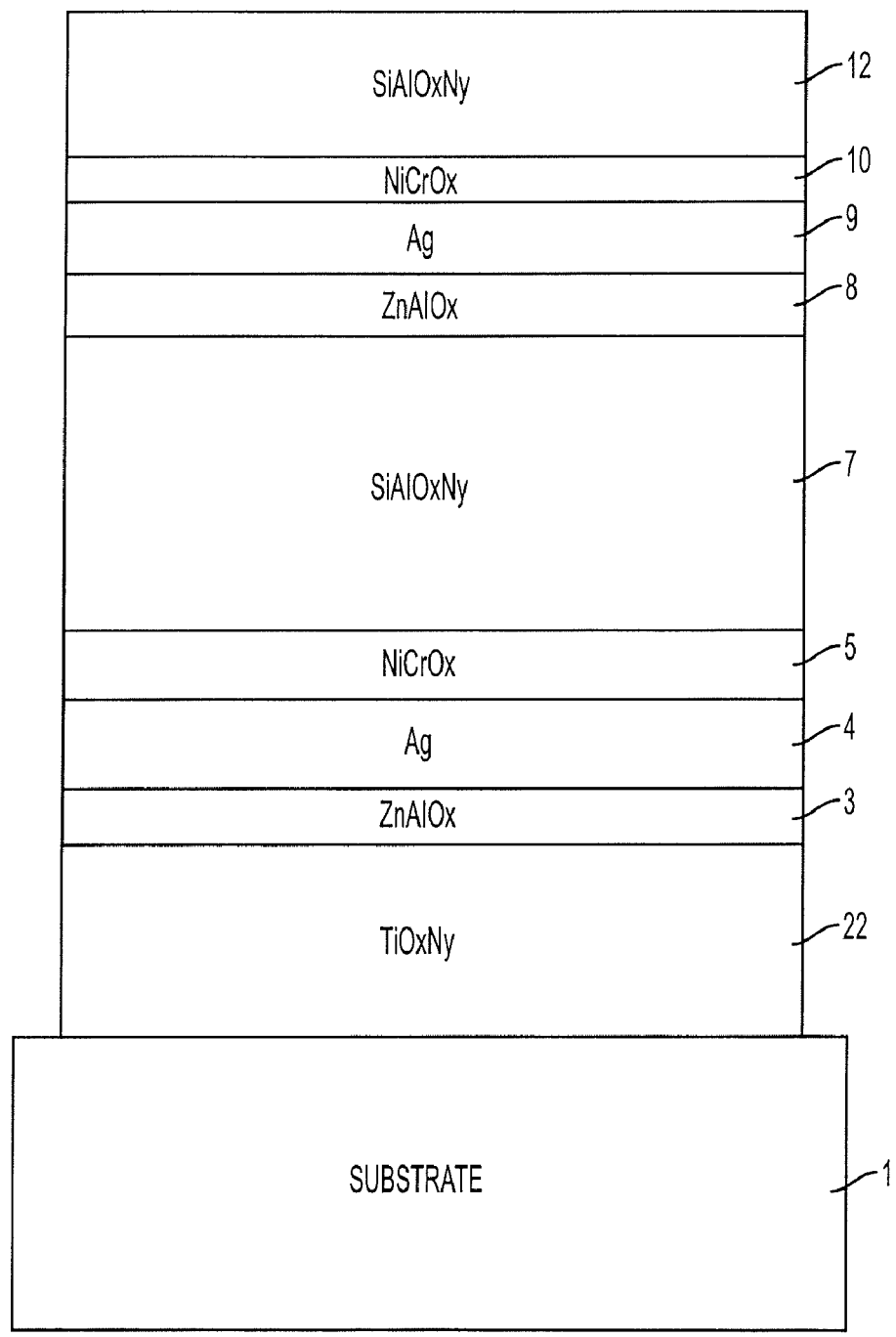
FIG. 12 depicts a cross sectional view of a coated article in accordance with articles known in the art.

FIG. 11 depicts a cross sectional view of a coated article similar to that of FIG. 8, but modified in accordance with the present invention to allow the coating to undergo heat treatment and to achieve superior mechanical durability to the coating of FIG. 8. The coated article in this embodiment includes substrate 1, which is typically glass, but may comprise quartz, ceramic, or other materials, first dielectric 2, which preferably comprises a material such as silicon nitride or silicon aluminum oxy-nitride. Typical thickness may be from about 11 nm to about 26 nm, preferably from about 16 nm to about 21 nm. In the illustrated embodiment, durability enhancement layer 13 comprises zirconium oxide. This layer typically is from about 2 nm to about 10 nm thick, preferably from about 4 nm to about 8 nm thick. The illustrated embodiment also includes nucleation layer 3, infrared reflecting layer 4, contact or barrier layer 5 typically comprising a transition metal, transition metal oxide, transition metal nitride or mixture of these materials, and an outermost dielectric 12.

Figure 13:
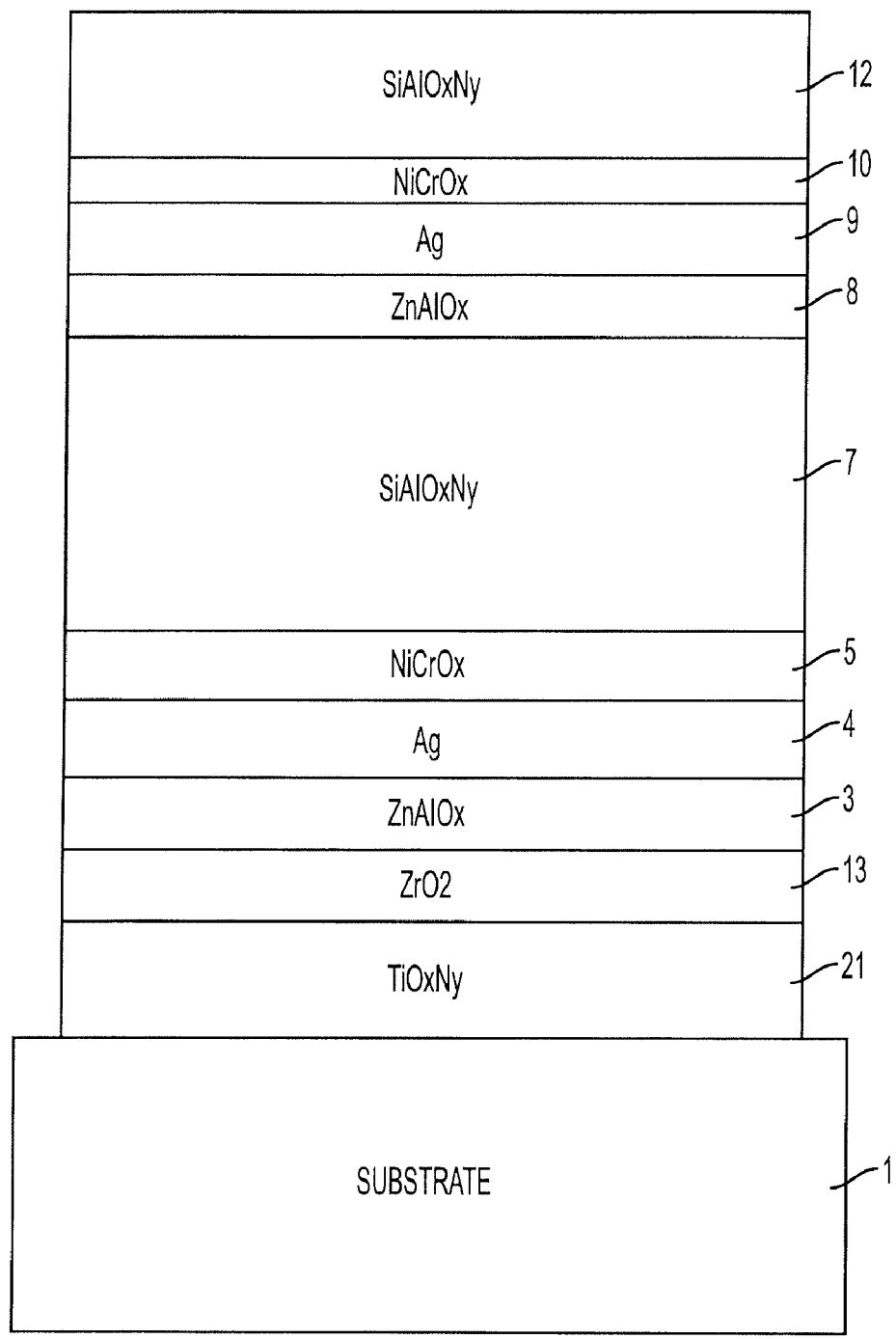
FIG. 13 depicts a cross sectional view of a coated article modified to allow heat treatment without optical and mechanical damage.

FIG. 13 depicts a cross sectional view of a coated article as modified in accordance with the invention to allow heat treatment without resulting optical and mechanical damage. In the illustrated embodiment, the coated article includes substrate 1 and a first dielectric 21 comprising a material such as such as titanium oxide, niobium oxide, titanium oxy-nitride, or niobium oxy-nitride. Preferably, the dielectric is predominantly an oxide. Typical thickness may be from about 10 nm to about 30 nm, preferably from about 15 nm to about 25 nm. In the illustrated embodiment, durability enhancement layer 13 comprises zirconium oxide and is preferably about 2 nm to about 10 nm thick, more preferably about 4 nm to about 8 nm thick. The illustrated embodiment also includes nucleation layer 3, infrared reflecting layer 4, contact or barrier layer 5, an internal dielectric 7, nucleation layer 8, infrared reflecting layer 9, a contact or barrier layer 10, and an outermost dielectric 12.

Figure 14:
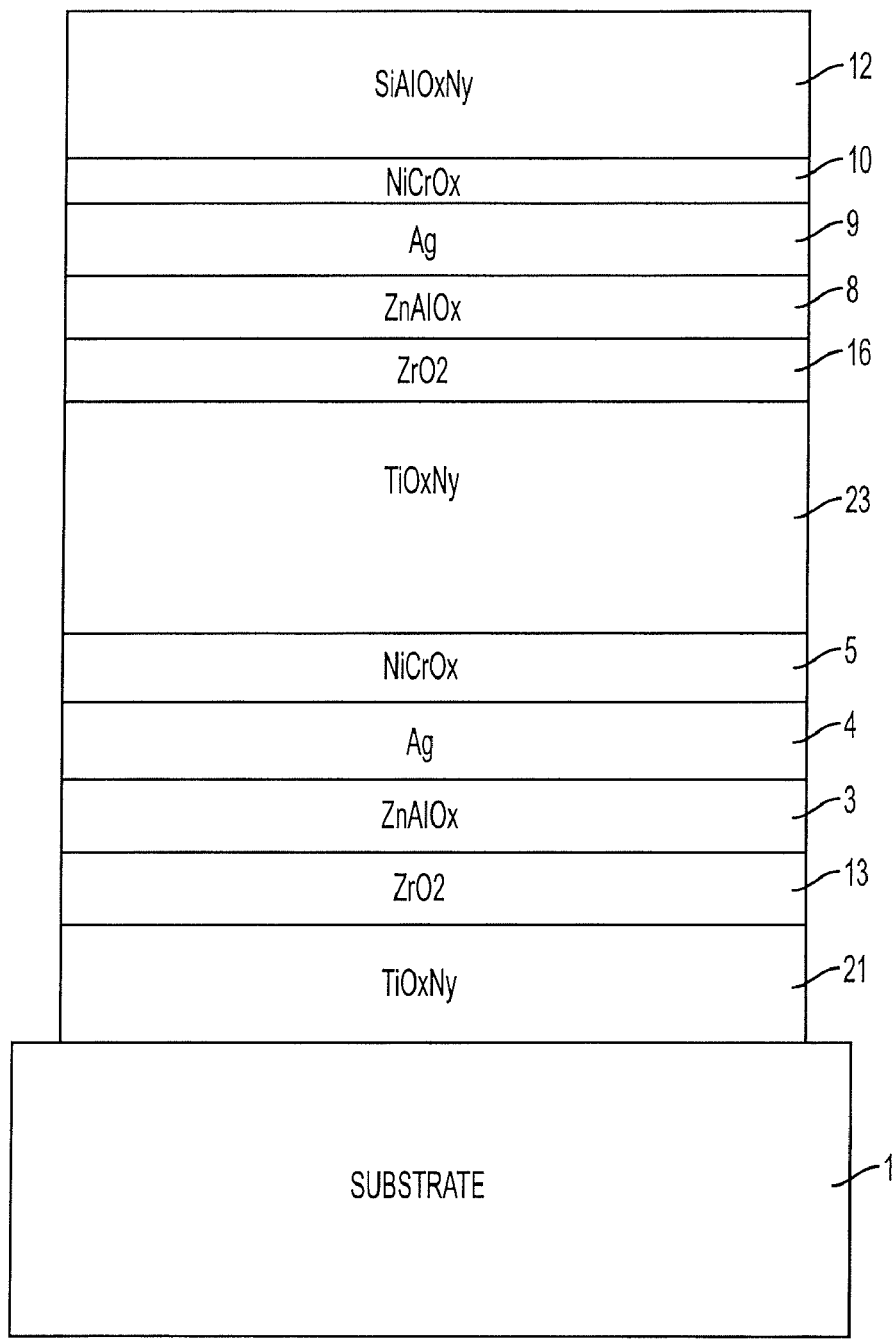
FIG. 14 depicts a cross sectional view of a coated article in accordance with the invention, comprising two durability enhancing layers to allow heat treatment without optical and mechanical damage.

FIG. 14 depicts a cross sectional view of a coated article comprising two durability enhancing layers in accordance with the invention, the coating allowing heat treatment without resulting optical and mechanical damage. In the embodiment illustrated in FIG. 14, the coated article includes substrate 1, first dielectric layer 21, preferably comprising a material such as titanium oxide, niobium oxide, titanium oxy-nitride, or niobium oxy-nitride. Preferably, the dielectric is predominantly an oxide. Typical thickness may be from about 10 nm to about 30 nm, preferably from about 15 nm to about 25 nm. In the illustrated embodiment, durability enhancement layer 13 comprises zirconium oxide, which is preferably about 2 nm to about 10 nm thick, more preferably about 4 nm to about 8 nm thick. The illustrated embodiment also includes nucleation layer 3, infrared reflecting layer 4, a contact or barrier layer 5, typically comprising a transition metal, transition metal oxide, transition metal nitride or mixture of these materials, internal dielectric 23, preferably comprising an oxide or oxy-nitride of titanium or niobium, more preferably, predominately an oxide. The illustrated embodiment also includes durability enhancement layer 13, which preferably comprises zirconium oxide and is preferably about 2 nm to about 10 nm thick, more preferably about 4 nm to about 8 nm thick. Moreover, the illustrated embodiment includes nucleation layer 8, infrared reflecting layer 9, contact or barrier layer 10, and an outermost dielectric 12.

Figure 15:
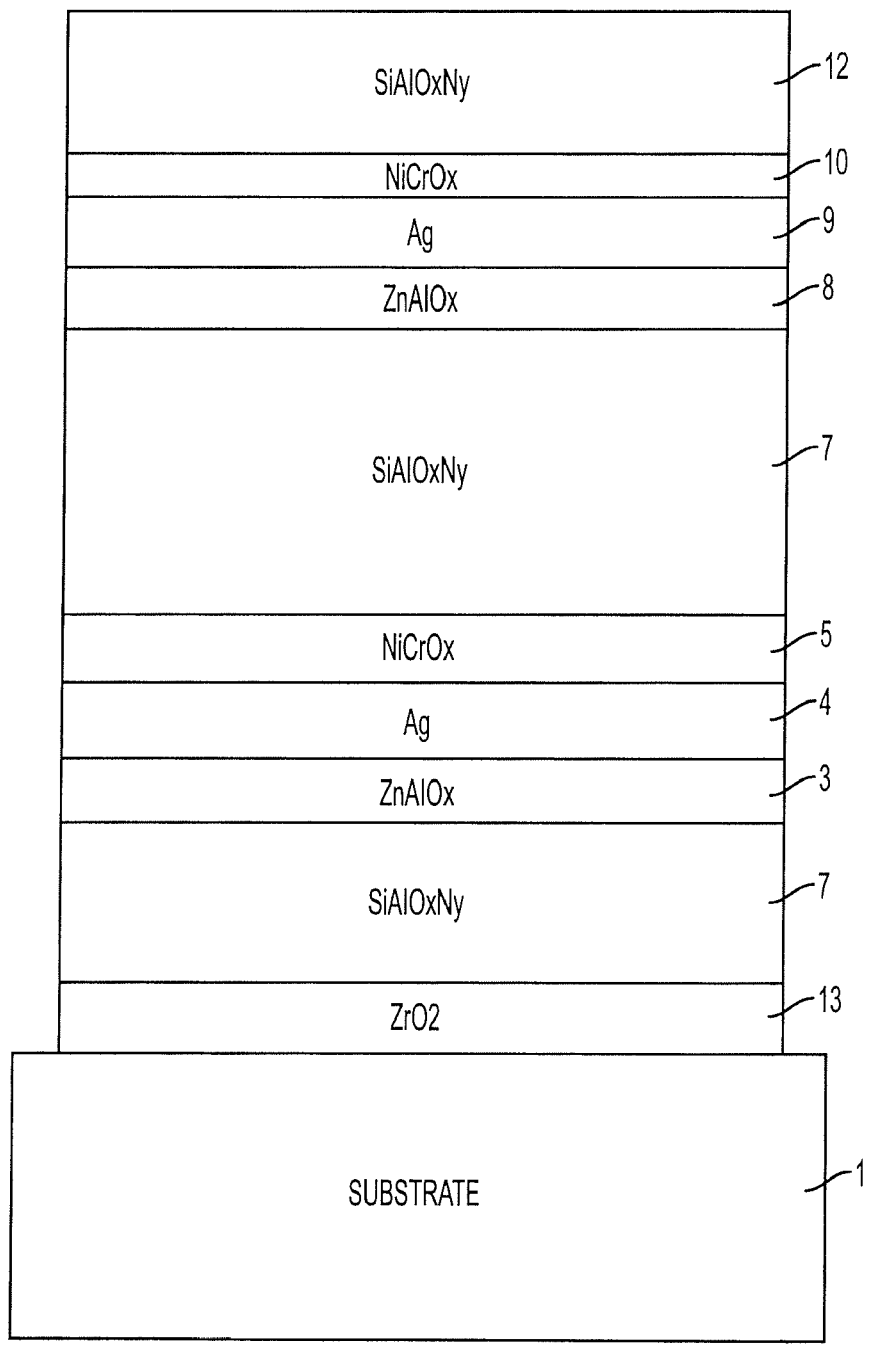
FIG. 15 depicts a cross sectional view of a coated article in modified in accordance with the invention to allow heat treatment without optical and mechanical damage.

FIG. 15 depicts a cross sectional view of a coated article modified in accordance with the invention to allow heat treatment without resulting optical and mechanical damage. In this illustrated embodiment, the coated article includes substrate 1, durability enhancement layer 13, preferably comprising zirconium oxide and preferably about 2 nm to about 10 nm thick. More preferably, this durability enhancing layer is about 4 nm to about 8 nm thick. In the illustrated embodiment, a first dielectric 7, comprising a material such as silicon aluminum oxy-nitride, is present. Typical thicknesses of this layer may be from about 10 nm to about 30 nm, preferably from about 15 nm to about 25 nm. The illustrated embodiment also includes, in accordance with the invention, nucleation layer 3, infrared reflecting layer 4, a contact or barrier layer 5 that typically comprises a transition metal, transition metal oxide, transition metal nitride or mixture of these materials, internal dielectric 7, nucleation layer 8, infrared reflecting layer 9, a contact or barrier layer 10, preferably comprising a transition metal or transition metal oxide, and an outermost dielectric layer 12.

Figure 16:
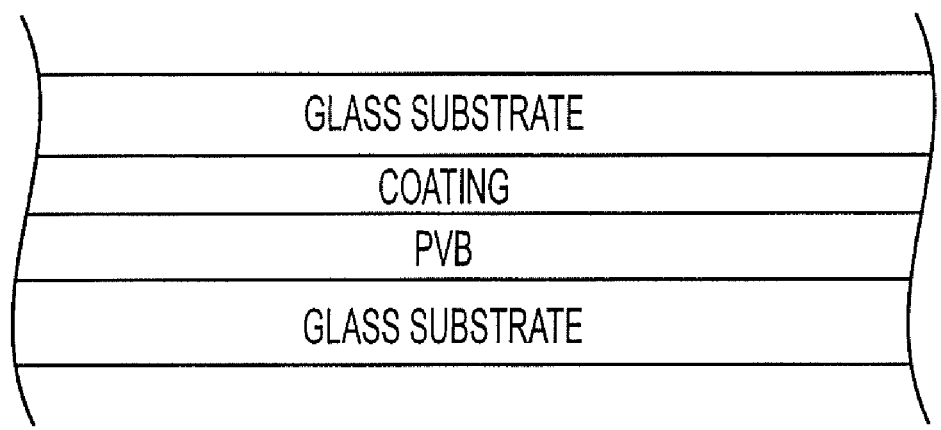
FIG. 16 depicts an embodiment of the present invention suitable for use in an automotive application.

FIG. 16 depicts an embodiment of the present invention suitable for use in an automotive or other vehicular application (such as a windshield or similar laminate). In the illustrated embodiment, a coating in accordance with an embodiment of the present invention is included in a stack of which also comprises two glass substrates and a polyvinyl butyral (PVB) layer. The coating may be on a surface of the first sheet or the second sheet.

Data generated from non-limiting examples of coating process runs conducted in accordance with the invention are included below. In the following tables, heat reflecting layer stacks are shown with corresponding wet brush damage and optical haze after heat treatment. In all entries, the substrate was 3 mm soda lime glass and in contact with layer #1.

| | layer 1 | layer 2 | layer 3 | layer 4 | layer 5 | layer 6 | layer 7 | layer 8 | layer 9 | layer 10 | layer 11 | layer 12 | layer 13 | layer 14 | wet brush damage | optical haze | scratch brush growth |
|---|---|---|---|---|---|---|---|---|---|---|---|---|---|---|---|---|---|
| 82-165-17 | SiAlOxNy 24 | ZnAlOx 7.5 | Ag 11 | NiCrOx 3 | SiAlOxNy 67 | ZnAlOx 7.5 | Ag 13.2 | NiCrOx 3 | SiAlOxNy 33 | | | | | | 35% | 0.33% | 46 |
| 82-165-16 | TiO2 13 | ZrO2 6 | ZnAlOx 7.5 | Ag 16 | NiCrOx 2 | SiAlOxNy 43 | | | | | | | | | 0% | 0.37% | 26 |
| 82-165-15 | TiO2 13 | ZrO2 6 | ZnAlOx 7.5 | Ag 16 | NiCrOx 2 | SiAlOxNy 43 | | | | | | | | | 0% | 0.35% | 29 |
| 82-165-14 | TiO2 10 | ZrO2 6 | ZnAlOx 7.5 | Ag 11 | NiCrOx 3 | ZrO2 8 | ZnAlOx 60 | ZrO2 8 | Ag 13.2 | NiCrOx 3 | SiAlOxNy 33 | | | | 0% | 1.08% | 32 |
| 82-165-13 | TiO2 10 | ZrO2 6 | ZnAlOx 7.5 | Ag 11 | NiCrOx 3 | ZrO2 8 | ZnAlOx 74 | Ag 13.2 | NiCrOx 3 | SiAlOxNy 33 | | | | | 0% | 0.65% | 65 |
| 82-165-12 | TiO2 10 | ZrO2 6 | ZnAlOx 7.5 | Ag 11 | NiCrOx 3 | ZrO2 5 | TiO2 24 | ZrO2 5 | NiCrOx 3 | ZrO2-CPA 5 | | | | | 0% | 0.42% | 36 |
| 82-165-11 | TiO2 10 | ZrO2 6 | ZnAlOx 7.5 | Ag 11 | NiCrOx 3 | TiO2 53 | ZrO2 8 | ZnAlOx 7.5 | Ag 13.2 | NiCrOx 3 | ZnAlOx 7.5 | Ag 13.2 | NiCrOx 3 | SiAlOxNy 33 | 0% | 0.33% | 25 |
| 82-165-10 | TiO2 10 | ZrO2 6 | ZnAlOx 7.5 | Ag 11 | NiCrOx 3 | ZrO2 8 | TiO2 24 | ZrO2 8 | ZnAlOx 7.5 | Ag 13.2 | SiAlOxNy 33 | | | | 0% | 0.63% | 40 |
| 82-165-9 | TiO2 10 | ZrO2 6 | ZnAlOx 7.5 | Ag 11 | NiCrOx 3 | TiO2 46 | ZrO2 8 | ZnAlOx 7.5 | Ag 13.2 | NiCrOx 3 | SiAlOxNy 33 | | | | 0% | 0.28% | 5 |
| 82-165-8 | ZrO2 5 | ZnAlOx 28 | Ag 11 | NiCrOx 3 | SiAlOxNy 67 | ZnAlOx 7.5 | Ag 13.2 | NiCrOx 3 | SiAlOxNy 33 | | | | | | 1.5% | 0.16% | 42 |
| 82-165-7 | TiO2 10 | ZrO2 6 | ZnAlOx 7.5 | Ag 11 | NiCrOx 3 | SiAlOxNy 67 | ZnAlOx 7.5 | Ag 13.2 | NiCrOx 3 | SiAlOxNy 33 | | | | | 2.0% | 0.15% | 26 |
| 82-165-6 | SiAlOxNy 24 | ZnAlOx 7.5 | Ag 11 | NiCrOx 3 | SiAlOxNy 67 | ZnAlOx 7.5 | Ag 13.2 | NiCrOx 3 | SiAlOxNy 33 | SiAlOxNy 33 | | | | | 20% | 0.17% | 40 |
| 82-165-4 | TiO2 10 | ZrO2 6 | ZnAlOx 7.5 | Ag 11 | NiCrOx 3 | ZnAlOx 7.5 | ZrO2 8 | ZnAlOx 7.5 | Ag 13.2 | NiCrOx 3 | SiAlOxNy 33 | | | | 0% | 1.50% | 29 |
| 82-165-3 | TiO2 10 | ZrO2 6 | ZnAlOx 7.5 | Ag 11 | NiCrOx 3 | ZnAlOx 7.5 | Ag 13.2 | Ag 13.2 | NiCrOx 3 | SiAlOxNy 33 | | | | | 0% | 4.11% | 27 |
| 82-165-2 | TiO2 10 | ZrO2 6 | ZnAlOx 7.5 | Ag 11 | NiCrOx 3 | ZnAlOx 7.5 | Ag 13.2 | Ag 13.2 | NiCrOx 3 | SiAlOxNy 33 | | | | | 75% | 2.43% | 24 |
| 82-165-1 | SiAlOxNy 24 | ZnAlOx 7.5 | Ag 11 | NiCrOx 3 | SiAlOxNy 67 | ZnAlOx 7.5 | Ag 13.2 | NiCrOx 6 | SiAlOxNy 33 | SiAlOxNy 33 | | | | | 15% | 0.15% | 21 |
| 82-163-01 | SiAlOxNy 24.0 | ZrO2 7.5 | Ag 11.0 | NiCrOx 3.0 | SiAlOxNy 67.0 | ZnAlOx 7.5 | Ag 13.2 | NiCrOx 3.0 | SiAlOxNy 33.0 | SiAlOxNy 33 | | | | | 45% | 0.22% | |
| 82-163-02 | TiOxNy 24.0 | ZnAlOx 7.5 | Ag 11.0 | NiCrOx 3.0 | SiAlOxNy 67.0 | ZnAlOx 7.5 | Ag 13.2 | NiCrOx 3.0 | SiAlOxNy 33.0 | SiAlOxNy 33 | | | | | 100% | 0.47% | |
| 82-163-03 | TiO2 20.0 | ZnAlOx 7.5 | Ag 11.0 | NiCrOx 3.0 | SiAlOxNy 67.0 | ZnAlOx 7.5 | Ag 13.2 | NiCrOx 3.0 | SiAlOxNy 33.0 | SiAlOxNy 33 | | | | | 100% | 0.16% | |
| 82-163-04 | TiO2 20.0 | ZnAlOx 7.5 | Ag 11.0 | NiCrOx 3.0 | SiAlOxNy 67.0 | ZnAlOx 7.5 | Ag 13.2 | NiCrOx 3.0 | SiAlOxNy 33.0 | SiAlOxNy 33 | | | | | 100% | 0.65% | |
| 82-163-05 | TiO2 10.0 | ZrO2 6.0 | ZnAlOx 7.5 | Ag 11.0 | NiCrOx 3.0 | SiN 67.0 | ZnAlOx 7.5 | Ag 13.2 | NiCrOx 3.0 | SiN 33.0 | | | | | 1.5% | 0.22% | |
| 82-163-06 | TiOxNy 10.0 | ZrO2 6.0 | ZnAlOx 7.5 | Ag 11.0 | NiCrOx 3.0 | SiN 67.0 | ZnAlOx 7.5 | Ag 13.2 | NiCrOx 3.0 | SiN 33.0 | | | | | 1% | 0.16% | |

-continued

| | layer 1 | layer 2 | layer 3 | layer 4 | layer 5 | layer 6 | layer 7 | layer 8 | layer 9 | layer 10 | layer 11 | layer 12 | layer 13 | layer 14 | wet brush damage | optical haze | scratch brush growth |
|---|---|---|---|---|---|---|---|---|---|---|---|---|---|---|---|---|---|
| 82-163-07 | TiOxNy 10.0 | ZrO2 6.0 | ZnAlOx 7.5 | Ag 11.0 | NiCrOx 3.0 | SiN 67.0 | ZnAlOx 7.5 | Ag 13.2 | NiCrOx 3.0 | SiN 33.0 | | | | | 1% | 0.21% | |
| 82-163-08 | TiOxNy 10.0 | ZrO2 6.0 | ZnAlOx 7.5 | Ag 11.0 | NiCrOx 3.0 | SiN 67.0 | ZnAlOx 7.5 | Ag 13.2 | NiCrOx 3.0 | SiN 33.0 | | | | | 1.5% | 0.14% | |
| 82-163-09 | TiOxNy 10.0 | ZrO2 6.0 | ZnAlOx 7.5 | Ag 11.0 | NiCrOx 3.0 | SiN 67.0 | ZnAlOx 7.5 | Ag 13.2 | NiCrOx 3.0 | SiN 33.0 | | | | | 1% | 0.34% | |
| 82-163-10 | TiOxNy 10.0 | ZrO2 6.0 | ZnAlOx 7.5 | Ag 11.0 | NiCrOx 3.0 | SiN 67.0 | ZnAlOx 7.5 | Ag 13.2 | NiCrOx 3.0 | SiN 33.0 | | | | | 2% | 0.16% | |
| 82-163-11 | ZrO2 5.0 | ZnAlOx 28.0 | Ag 11.0 | NiCrOx 3.0 | SiAlOxNy 67.0 | ZnAlOx 7.5 | Ag 13.2 | NiCrOx 3.0 | SiAlOxNy 33.0 | | | | | | 1% | 0.20% | |
| 82-163-12 | ZrO2 5.0 | ZnAlOx 28.0 | Ag 11.0 | NiCrOx 3.0 | SiAlOxNy 67.0 | ZnAlOx 7.5 | Ag 13.2 | NiCrOx 3.0 | SiAlOxNy 33.0 | | | | | | 1% | 0.15% | |
| 82-163-13 | ZrO2 5.0 | ZnAlOx 28.0 | Ag 11.0 | NiCrOx 3.0 | SiAlOxNy 67.0 | ZnAlOx 7.5 | Ag 13.2 | NiCrOx 3.0 | SiAlOxNy 33.0 | | | | | | 1.5% | 0.16% | |
| 82-143-01 | ZnSnOx 22.0 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 30.0 | | | | | | 70% | 0.27% | |
| 82-143-02 | ZnSnOx 22.0 | ZnAlOx 7.5 | Ag 11.0 | NiCrOx 3.0 | SiAlOxNy 66.0 | ZnAlOx 7.5 | Ag 13.2 | NiCrOx 3.0 | SiAlOxNy 33.0 | | | | | | 85% | 0.26% | |
| 82-143-03 | ZnSnOx 22.0 | ZnAlOx 7.5 | Ag 11.0 | NiCrOx 3.0 | SiAlOxNy 65.0 | ZnAlOx 7.5 | Ag 13.2 | NiCrOx 3.0 | SiAlOxNy 32.0 | | | | | | 85% | 0.21% | |
| 82-143-04 | ZnSnOx 26.0 | ZnAlOx 4.0 | Ag 11.0 | NiCrOx 3.0 | SiAlOxNy 65.0 | ZnAlOx 7.5 | Ag 13.2 | NiCrOx 3.0 | SiAlOxNy 32.0 | | | | | | 60% | 0.26% | |
| 82-143-05 | ZnSnOx 17.0 | ZnAlOx 13.0 | Ag 11.0 | NiCrOx 3.0 | SiN 65.0 | ZnAlOx 7.5 | Ag 13.2 | NiCrOx 3.0 | SiN 32.0 | | | | | | 60% | 0.21% | |
| 82-143-06 | ZrO2 5 | ZnSnOx 18.0 | ZnAlOx 7.5 | Ag 11.0 | NiCrOx 3.0 | SiN 65.0 | ZnAlOx 7.5 | Ag 13.2 | NiCrOx 3.0 | SiAlOxNy 32.0 | | | | | 50% | 0.19% | |
| 82-143-07 | ZrO2 10 | ZnSnOx 13.0 | ZnAlOx 7.5 | Ag 11.0 | NiCrOx 3.0 | SiN 65.0 | ZnAlOx 7.5 | Ag 13.2 | NiCrOX 3.0 | SiAlOxNy 32.0 | | | | | 70% | 0.22% | |
| 82-143-08 | ZrO2 5 | ZnSnOx 18.0 | ZnAlOx 7.5 | Ag 11.0 | NiCrOx 3.0 | SiN 65.0 | ZnAlOx 7.5 | Ag 13.2 | NiCrOx 3.0 | SiAlOxNy 32.0 | | | | | 12% | 0.18% | |
| 82-143-13 | ZnSnOx 10.0 | ZnAlOx 7.5 | Ag 11.0 | NiCrOx 3.0 | SiN 65.0 | ZnAlOx 7.5 | Ag 13.2 | NiCrOx 3.0 | SiN 32.0 | | | | | | 98% | 0.46% | |
| 82-143-14 | ZnSnOx 10.0 | ZrO2 10 | ZnAlOx 7.5 | Ag 11.0 | NiCrOx 3.0 | SiN 65.0 | ZnAlOx 7.5 | Ag 13.2 | NiCrOx 3.0 | SiAlOxNy 32.0 | | | | | 1% | 0.18% | |
| 62-137-03 | SiAlOxNy 22.0 | ZnAlOx 7.5 | ZnAlOx 7.5 | NiCrOx 3.0 | SiN 69.0 | SiN 69.0 | Ag 13.2 | NiCrOx 3.0 | NiCrOx 3.0 | SiAlOxNy 33.0 | | | | | 95% | 1.25% | |
| 82-137-04 | ZrOxNy 2 | ZnAlOx 20.0 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 5% | 1.29% | |
| 82-137-05 | ZrOxNy 5 | ZnAlOx 17.0 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 20% | 1.29% | |
| 82-137-06 | ZrOxNy 5 | ZnAlOx 17.0 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 40% | 1.30% | |
| 82-137-07 | ZrOx 5 | ZrOx 17.0 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 15% | 1.33% | |
| 82-137-08 | TiOxNy 16.0 | ZrOx 4 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 50% | 0.13% | |

| | layer 1 | layer 2 | layer 3 | layer 4 | layer 5 | layer 6 | layer 7 | layer 8 | layer 9 | layer 10 | layer 11 | layer 12 | layer 13 | layer 14 | wet brush damage | optical haze | scratch brush growth |
|---|---|---|---|---|---|---|---|---|---|---|---|---|---|---|---|---|---|
| 82-165 | TiOxNy 14.0 | ZrOx 4 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 70% | 0.19% | |
| 82-137-09 | TiOxNy 10.0 | ZrOx 4 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 80% | 0.17% | |
| 82-137-10 | TiOxNy 8.0 | ZrOx 6 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 15% | 0.14% | |
| 82-137-11 | TiOxNy 6.0 | ZrOx 6.0 | ZnAlOx 12.0 | Ag 11.0 | NiCrOx 3.0 | SiN 69.0 | ZnAlOx 7.5 | Ag 13.2 | NiCrOx 3.0 | SiAlOxNy 33.0 | | | | | 15% | 0.15% | |
| 82-137-12 | SiAlOxNy 22.0 | ZnAlOx 7.5 | Ag 11.0 | NiCrOx 3.0 | SiAlOxNy 69.0 | ZnAlOx 7.5 | ZnAlOx 7.5 | NiCrOx 3.0 | SiAlOxNy 33.0 | | | | | | 50% | 0.25% | |
| 82-133-01 | ZrOx 1 | ZnAlOx 21.0 | ZnAlOx 7.5 | Ag 11.0 | NiCrOx 3.0 | SiN 69.0 | ZnAlOx 7.5 | Ag 13.2 | NiCrOx 3.0 | SiN 33.0 | | | | | 5% | 0.32% | |
| 82-133-02 | ZrOx 2 | ZnAlOx 20.0 | ZnAlOx 7.5 | Ag 11.0 | NiCrOx 3.0 | SiN 69.0 | ZnAlOx 7.5 | Ag 13.2 | NiCrOx 3.0 | SiN 33.0 | | | | | 5% | 0.47% | |
| 82-133-03 | ZrOx 3 | ZnAlOx 19.0 | ZnAlOx 7.5 | Ag 11.0 | NiCrOx 3.0 | SiN 69.0 | ZnAlOx 7.5 | Ag 13.2 | NiCrOx 3.0 | SiN 33.0 | | | | | 1% | 0.23% | |
| 82-133-04 | ZrOx 4 | ZnAlOx 18.0 | ZnAlOx 7.5 | Ag 11.0 | NiCrOx 3.0 | SiN 69.0 | ZnAlOx 7.5 | Ag 13.2 | NiCrOx 3.0 | SiN 33.0 | | | | | 15% | 0.22% | |
| 82-133-05 | ZrOx 5 | ZnAlOx 17.0 | ZnAlOx 7.5 | Ag 11.0 | NiCrOx 3.0 | SiN 69.0 | ZnAlOx 7.5 | Ag 13.2 | NiCrOx 3.0 | SiN 33.0 | | | | | 10% | 0.23% | |
| 82-133-06 | Ti 3.5 | ZrOx 5 | Ag 15.0 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | 90% | 0.29% | |
| 82-133-07 | ZrOx 5 | ZrOx 5 | ZnAlOx 15.0 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | 1% | 0.22% | |
| 82-133-08 | TiOx 5.0 | ZrOx 5 | ZnAlOx 1 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | 10% | 0.21% | |
| 82-133-09 | TiOx 5.0 | ZnAlOx 5 | ZrOx 2 | ZnAlOx 7.5 | Ag 11.0 | ZnAlOx 7.5 | Ag 13.2 | NiCrOx 3.0 | SiAlOxNy 33.0 | | | | | | 80% | 0.24% | |
| 82-133-10 | ZrOx 1 | ZnAlOx 20.0 | ZrOx 4 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | 60% | 0.29% | |
| 82-133-11 | ZrOx 2 | ZnAlOx 18.0 | ZrOx 2 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | 40% | 0.27% | |
| 82-133-12 | ZrOx 4 | ZnAlOx 14.0 | ZrOx 4 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | 5% | 0.22% | |
| 82-133-13 | ZrOx 6 | ZnAlOx 10.0 | ZrOx 6 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | 2% | 0.21% | |
| 82-133-14 | ZrOx 6 | ZnAlOx 14.0 | ZrOx 6 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | 15% | 0.23% | |
| 82-133-15 | ZrOx 2 | ZnAlOx 14.0 | ZrOx 2 | ZnAlOx 7.5 | SiN 69.0 | ZnAlOx 7.5 | Ag 13.2 | NiCrOx 3.0 | SiN 33.0 | NiCrOx 3.0 | SiAlOxNy 33.0 | | | | 3% | 0.21% | |
| 82-133-16 | ZrOx 6 | ZnAlOx 14.0 | ZrOx 6 | Ag 11.0 | NiCrOx 3.0 | SiAlOxNy 7.5 | Ag 13.2 | NiCrOx 3.0 | NiCrOx 3.0 | SiAlOxNy 33.0 | | | | | 35% | 0.16% | |
| 82-127-01 | SiAlOxNy 22 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | | 1% | 0.18% | |
| 82-127-02 | ZrOx 22 | ZnAlOx 7.5 | Ag 11.0 | NiCrOx 3.0 | ZnAlOx 7.5 | ZnAlOx 7.5 | Ag 13.2 | NiCrOx 3.0 | SiAlOxNy 33.0 | | | | | | 90% | 0.25% | |
| 82-127-03 | ZrOx 5 | TiOx 17 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | | | | |

-continued

| | layer 1 | layer 2 | layer 3 | layer 4 | layer 5 | layer 6 | layer 7 | layer 8 | layer 9 | layer 10 | layer 11 | layer 12 | layer 13 | layer 14 | wet brush damage | optical haze | scratch brush growth |
|---|---|---|---|---|---|---|---|---|---|---|---|---|---|---|---|---|---|
| 82-165 | | | | | | | | | | | | | | | | | |
| 82-127-04 | ZrOx 5 | TiOx 17 | ZrOx 5 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | 20% | 0.19% | |
| 82-127-05 | TiOx 5 | ZrOx 17 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | | 30% | 0.18% | |
| 82-127-06 | TiOx 5 | ZrOx 12 | ZrOx 5 | ZnAlOx 7.5 | Ag 11.0 | NiCrOx 3.0 | SiN 69.0 | ZnAlOx 7.5 | Ag 13.2 | NiCrOx 3.0 | SiN 33.0 | | | | 80% | 0.30% | |
| 82-127-07 | ZrOxNy 11 | ZrOxNy 11 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | | 60% | 2.18% | |
| 82-127-08 | ZnAlOx 22.0 | ZnAlOx 17.0 | Ag 11.0 | NiCrOx 3.0 | SiN 69.0 | ZnAlOx 7.5 | Ag 13.2 | NiCrOx 3.0 | SiN 33.0 | | | | | | 20% | 0.28% | |
| 82-127-09 | TiOxNy 11 | ZrOxNy 11 | ZnAlOx 7.5 | Ag 11.0 | NiCrOx 3.0 | ZnAlOx 7.5 | Ag 13.2 | NiCrOx 3.0 | SiAlOxNy 33.0 | | | | | | 85% | 1.27% | |
| 82-127-10 | NiCrOx 5.0 | ZnAlOx 17.0 | ZnAlOx 7.5 | Ag 11.0 | NiCrOx 3.0 | NiCrOx 3.0 | ZnAlOx 7.5 | Ag 13.2 | NiCrOx 3.0 | SiAlOxNy 33.0 | | | | | 45% | 0.30% | |
| 82-127-11 | ZnAlOx 11.0 | ZnAlOx 7.5 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | | 5% | 0.17% | |
| 82-127-12 | ZrOx 5 | ZrOx 12.0 | ZrOx 6 | ZnAlOx 7.5 | Ag 11.0 | NiCrOx 3.0 | ZnAlOx 7.5 | Ag 13.2 | NiCrOx 3.0 | SiAlOxNy 33.0 | | | | | 35% | 0.40% | |
| 82-127-13 | TiOx 5 | ZnAlOx 12.0 | ZrOx 5 | ZnAlOx 7.5 | Ag 11.0 | SiAlOxNy 69.0 | SiAlOxNy 69.0 | ZnAlOx 7.5 | Ag 13.2 | NiCrOx 3.0 | SiAlOxNy 33.0 | | | | 40% | 0.20% | |
| 82-127-14 | ZnAlOx 11.0 | ZrOx 11 | Ag 11.0 | NiCrOx 3.0 | NiCrOx 3.0 | SiAlOxNy 69.0 | ZnAlOx 7.5 | NiCrOx 3.0 | SiAlOxNy 32.0 | SiAlOxNy 33.0 | | | | | 2% | 0.23% | |
| 82-127-15 | ZrOx 6 | ZnAlOx 12.0 | ZrOx 6 | ZnAlOx 7.5 | SiAlOxNy 69.0 | NiCrOx 3.0 | SiAlOxNy 69.0 | NiCrOx 3.0 | SiAlOxNy 32.0 | SiAlOxNy 33.0 | | | | | 2% | 0.18% | |
| 82-127-16 | SiAlOxNy 22.0 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | | | 80% | 0.16% | |
| 82-127-17 | ZrOx 5 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | | | 45% | 0.12% | |
| 82-127-18 | SiAlOxNy 17.0 | ZrOx 7.5 | ZnAlOx 7.5 | Ag 11.0 | NiCrOx 3.0 | ZnAlOx 7.5 | ZnAlOx 7.5 | Ag 13.2 | NiCrOx 3.0 | SiAlOxNy 33.0 | | | | | 95% | 0.27% | |
| 82-127-19 | ZrOx 5 | SiAlOxNy 12.0 | ZrOx 5 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | 95% | 0.37% | |
| 82-123-04 | SiAlOxNy 22 | ZnAlOx 11 | Ag 11.0 | NiCrOx 3.0 | NiCrOx 3.0 | ZnAlOx 7.5 | Ag 13.2 | NiCrOx 3.0 | SiAlOxNy 32.0 | | | | | | 100% | 0.19% | |
| 82-123-05 | ZrOx 22 | ZnAlOx 7.5 | Ag 11.0 | NiCrOx 3.0 | SiAlOxNy 69.0 | ZnAlOx 7.5 | NiCrOx 3.0 | SiAlOxNy 32.0 | | | | | | | 1% | 0.22% | |
| 82-123-06 | ZrOx 22 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 32.0 | | | | | | 95% | 0.23% | |
| 82-123-07 | ZrOxNy 22 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 32.0 | | | | | | 15% | 0.26% | |
| 82-125-01 | SiAlOxNy 22 | ZnAlOx 7.5 | Ag 11.0 | NiCrOx 3.0 | NiCrOx 3.0 | ZnAlOx 7.5 | Ag 13.2 | NiCrOx 3.0 | SiAlOxNy 32.0 | | | | | | 100% | 0.23% | |
| 82-125-02 | ZrOxNy 11 | TiOx 11 | ZnAlOx 7.5 | NiCrOx 3.0 | NiCrOx 3.0 | SiN 69.0 | ZnAlOx 7.5 | Ag 13.2 | NiCrOx 3.0 | SiAlOxNy 32.0 | | | | | | 0.20% | |
| 82-125-03 | ZrOxNy 11 | TiOxNy 11 | ZnAlOx 7.5 | Ag 11.0 | NiCrOx 3.0 | SiN 69.0 | ZnAlOx 7.5 | Ag 13.2 | NiCrOx 3.0 | SiAlOxNy 32.0 | | | | | 100% | 0.34% | |

-continued

| 82-165 | layer 1 | layer 2 | layer 3 | layer 4 | layer 5 | layer 6 | layer 7 | layer 8 | layer 9 | layer 10 | layer 11 | layer 12 | layer 13 | layer 14 | wet brush damage | optical haze | scratch brush growth |
|---|---|---|---|---|---|---|---|---|---|---|---|---|---|---|---|---|---|
| 82-125-04 | TiOx 11 | ZrOxNy 11 | ZnAlOx 7.5 | Ag 11.0 | NiCrOx 3.0 | SiN 69.0 | ZnAlOx 7.5 | Ag 13.2 | NiCrOx 3.0 | SiAlOxNy 32.0 | | | | | 100% | 0.21% | |
| 82-125-05 | TiOxNy 11 | ZrOxNy 11 | ZnAlOx 7.5 | Ag 11.0 | NiCrOx 3.0 | SiN 69.0 | ZnAlOx 7.5 | Ag 13.2 | NiCrOx 3.0 | SiAlOxNy 32.0 | | | | | 100% | 0.27% | |
| 82-125-06 | SiAlOxNy 22 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 32.0 | | | | | | 60% | 0.20% | |
| 82-125-07 | TiOx 22 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 32.0 | | | | | | 70% | 0.19% | |
| 82-125-08 | TiOxNy 22 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 32.0 | | | | | | 100% | 0.34% | |
| 82-125-09 | TiOx O2 22 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 32.0 | | | | | | 95% | 0.35% | |
| 82-125-10 | SiAlOxNy 22 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | | | 65% | 0.18% | |
| 82-125-11 | NiCrOx 2.0 | ZrOxNy 20 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 100% | 2.59% | |
| 82-125-12 | NiCrOx 2.0 | TiOx 20 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 90% | 0.19% | |
| 82-125-13 | NiCrOx 2.0 | TiOxNy 20 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 95% | 0.23% | |
| 82-125-14 | SiAlOxNy 22 | ZnAlOx 7.5 | Ag 11.0 | NiCrOx 3.0 | SiAlOxNy 69.0 | ZnAlOx 7.5 | Ag 13.2 | NiCrOx 3.0 | SiAlOxNy 33.0 | | | | | | 50% | 0.18% | |
| 82-125-15 | ZrOxNy 5 | TiOx 17 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 85% | 0.14% | |
| 82-125-16 | ZrOxNy 5 | TiOxNy 17 | ZnAlOx 7.5 | Ag 11.0 | NiCrOx 3.0 | SiN 69.0 | ZnAlOx 7.5 | Ag 13.2 | NiCrOx 3.0 | SiAlOxNy 33.0 | | | | | 95% | 0.43% | |
| 82-125-17 | SiAlOxNy 22 | ZnAlOx 7.5 | Ag 11.0 | NiCrOx 3.0 | SiAlOxNy 69.0 | ZnAlOx 7.5 | NiCrOx 3.0 | SiAlOxNy 33.0 | | | | | | | 85% | 0.17% | |

While the present invention has been described with respect to specific embodiments, it is not confined to the specific details set forth, but includes various changes and modifications that may suggest themselves to those skilled in the art, all falling within the scope of the invention as defined by the following claims.

What is claimed:

1. An optical coating on a substrate, the coating comprising, in order outward from the substrate,
   a first dielectric layer;
   a durability enhancement layer comprising an oxide or oxynitride of zirconium disposed directly on the first dielectric layer;
   a subcomposite multilayer comprising
      i) a nucleation layer including Zn;
      ii) an infrared reflecting layer;
      iii) a barrier layer; and
   optionally,
   a second dielectric layer.

2. The coating of claim 1, wherein the durability enhancement layer is in contact with the nucleation layer.

3. The coating of claim 1, wherein the coating is heat-treated or tempered.

4. The coating of claim 3, wherein the coating has an optical haze that is less than about 0.6% after being heat-treated or tempered.

5. The coating of claim 3, wherein the coating has improved mechanical durability as compared to a coating that does not comprise a durability enhancement layer.

6. The coating of claim 1, wherein the first dielectric layer comprises an oxide or oxynitride layer of titanium.

7. The coating of claim 1, wherein the nucleation layer comprises an oxide of zinc.

8. The coating of claim 1, wherein the infrared reflecting layer comprises silver, gold, copper, a nitride of titanium, a nitride of zirconium, nickel-chromium or combinations thereof.

9. The coating of claim 1, wherein the coating comprises at least one topcoat comprising an oxide, nitride or oxynitride of silicon or zirconium, or combinations thereof.

10. A window unit comprising the optical coating of claim 1, wherein the window unit is an insulated glass unit, a monolithic glass unit, a vehicular glass unit, or an architectural glass unit.

11. The coating of claim 1, wherein the first and second dielectric layers do not contain Zr.

12. The coating of claim 1, further comprising one or more additional subcomposite multilayers.

13. A method of making an optical thin layer film having enhanced durability, said method comprising depositing on a substrate the coating of claim 1.

14. The coating of claim 1, wherein the durability enhancement layer is about 2 nm to about 10 nm thick.

15. The coating of claim 14, wherein the durability enhancement layer is about 4 nm to about 8 nm thick.

* * * * *